United States Patent [19]
Goodley

[11] 3,847,071
[45] Nov. 12, 1974

[54] STRAPPING MACHINE FEED
[75] Inventor: George F. Goodley, Media, Pa.
[73] Assignee: FMC Corporation, San Jose, Calif.
[22] Filed: Feb. 14, 1973
[21] Appl. No.: 332,465

Related U.S. Application Data
[62] Division of Ser. No. 198,862, Nov. 15, 1971, Pat. No. 3,759,169.

[52] U.S. Cl. .................................. 100/32, 226/183
[51] Int. Cl. ........................................... B65b 13/32
[58] Field of Search .......... 100/26, 29, 33 PB, 33 R, 100/32, 4; 226/183

[56] References Cited
UNITED STATES PATENTS

| | | | |
|---|---|---|---|
| 2,880,666 | 4/1959 | Rogers | 100/26 |
| 3,269,300 | 8/1966 | Billett et al. | 100/4 |
| 3,442,203 | 5/1969 | Kobiella | 100/26 |
| 3,447,447 | 6/1969 | Rutty | 100/26 |
| 3,566,778 | 3/1971 | Vilcins | 100/32 |
| 3,590,729 | 7/1971 | Plattner | 100/32 |
| 3,752,058 | 8/1973 | Lems | 100/32 |

Primary Examiner—Billy J. Wilhite
Attorney, Agent, or Firm—C. E. Tripp

[57] ABSTRACT

This machine straps a package with heat sealable plastic strapping. The strap is fed by geared feed and tension wheels around a yoke and against a stop. The strap is gripped against a side-retractable anvil on opposite sides of a vertically moving platen and knife assembly, while straddling a retractible tongue. A heated blade replaces the tongue whereupon the platen squeezes the heated joint and cuts the strap. The anvil and tongue are withdrawn for removal of the strapped package. The platen, tongue, anvil and sealing blade are controlled by a set of cams on a linear actuator.

1 Claim, 32 Drawing Figures

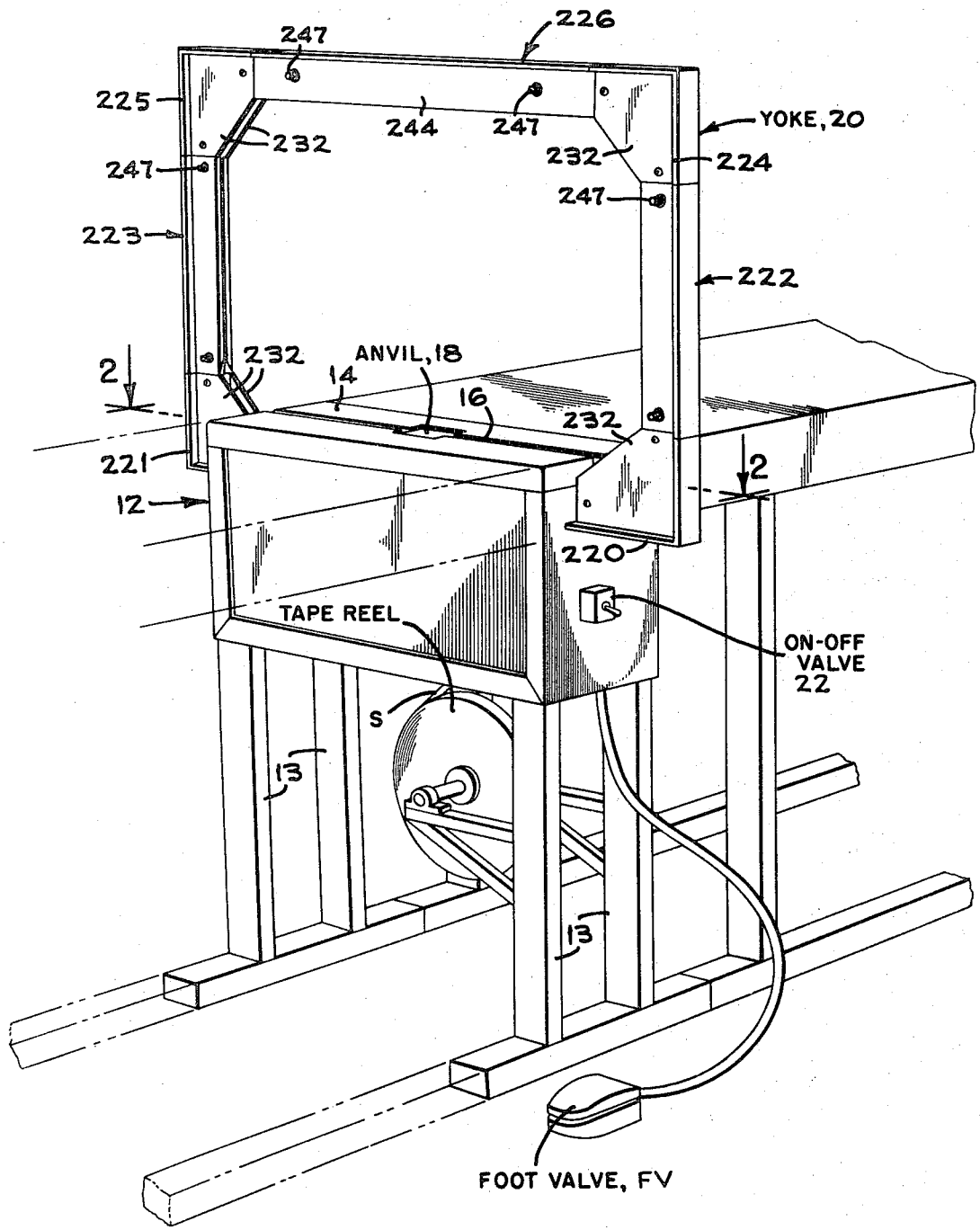

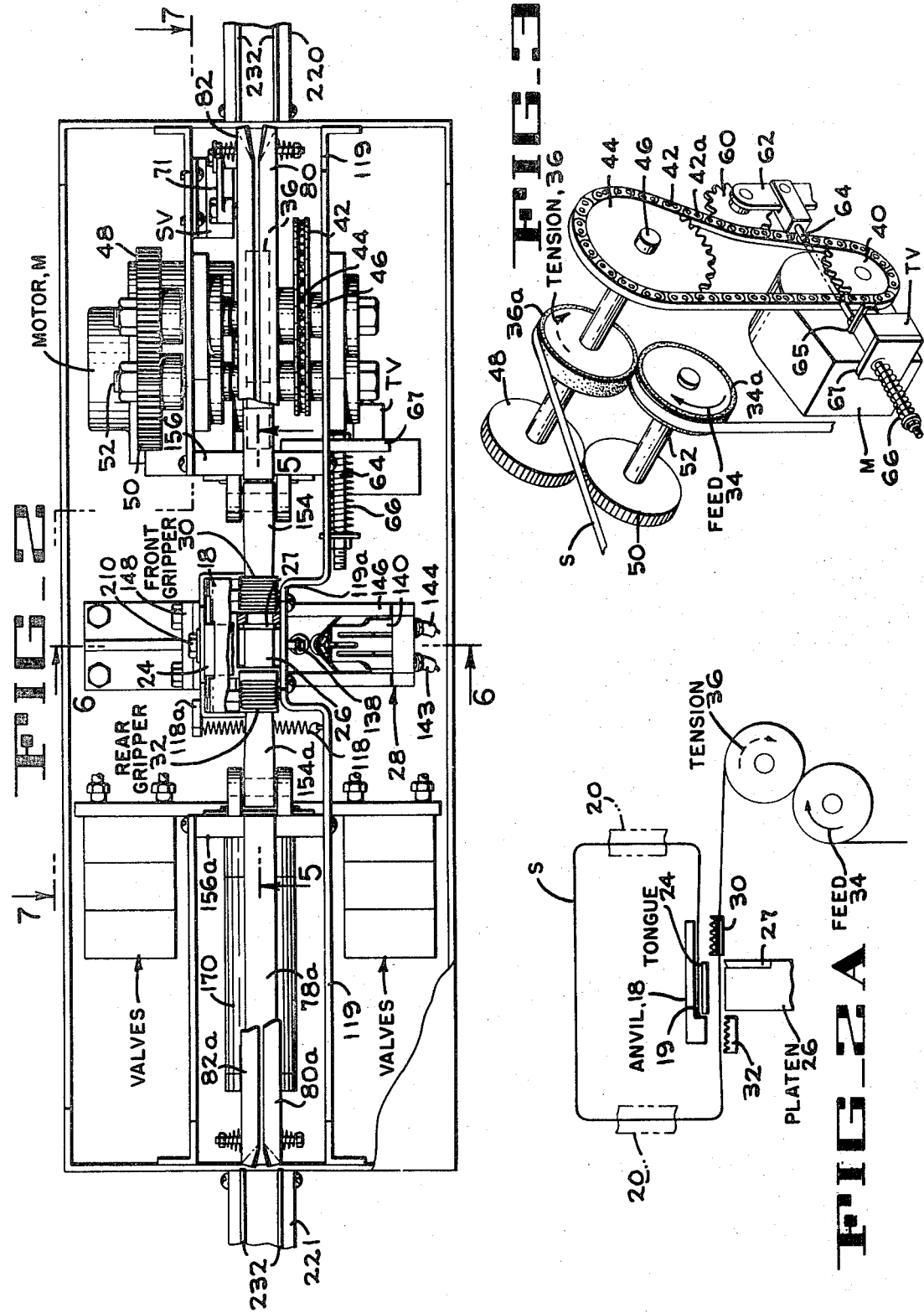

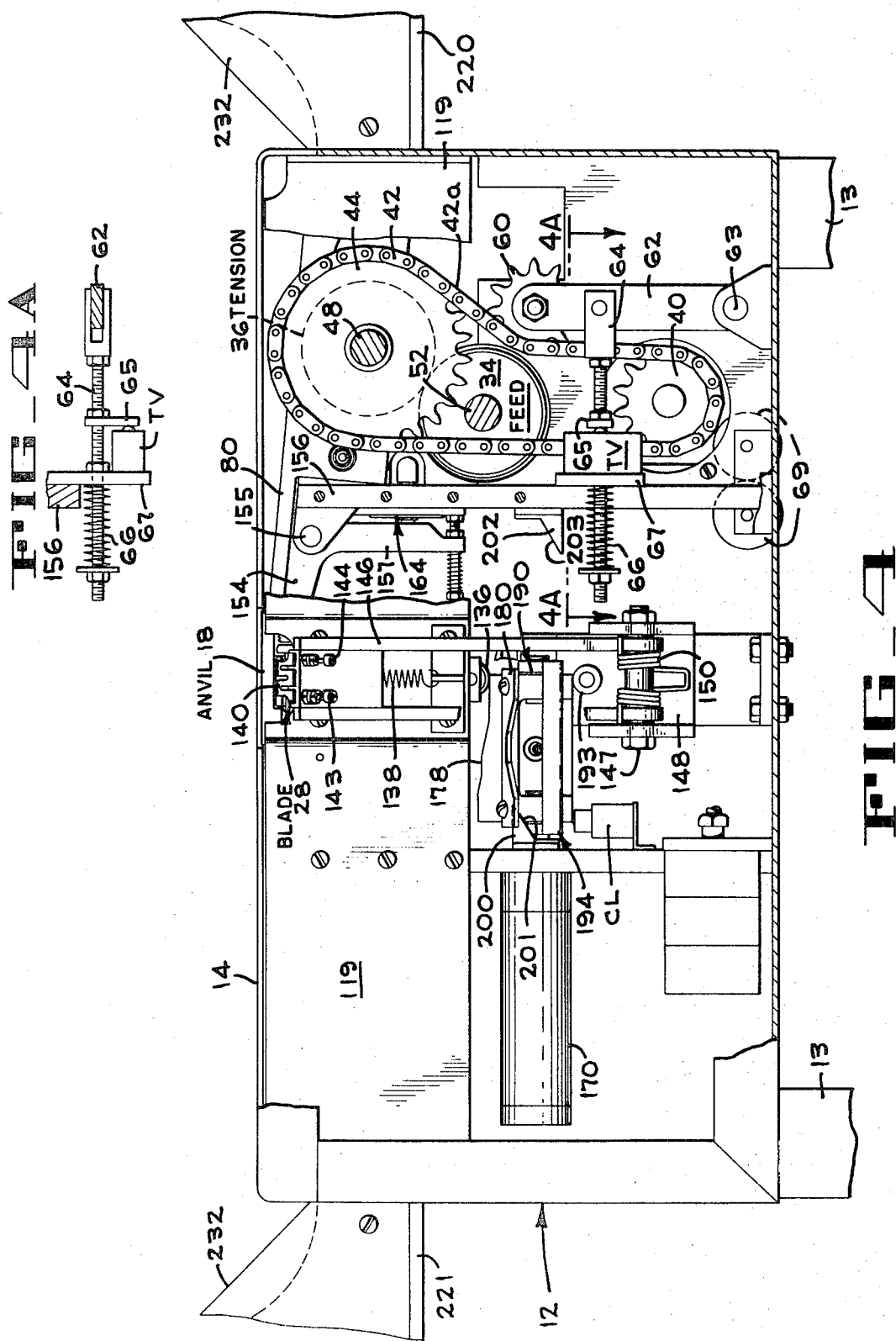

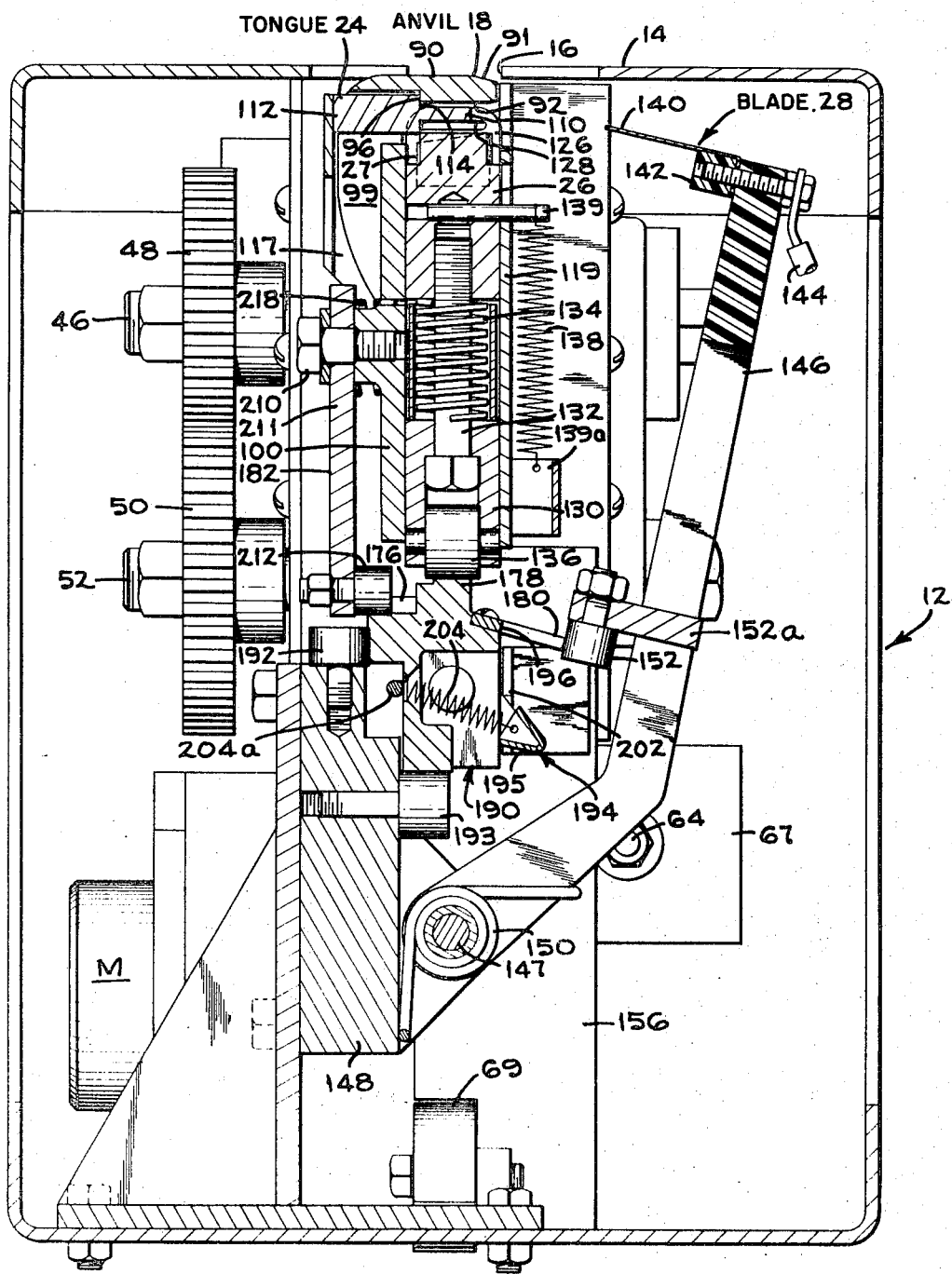

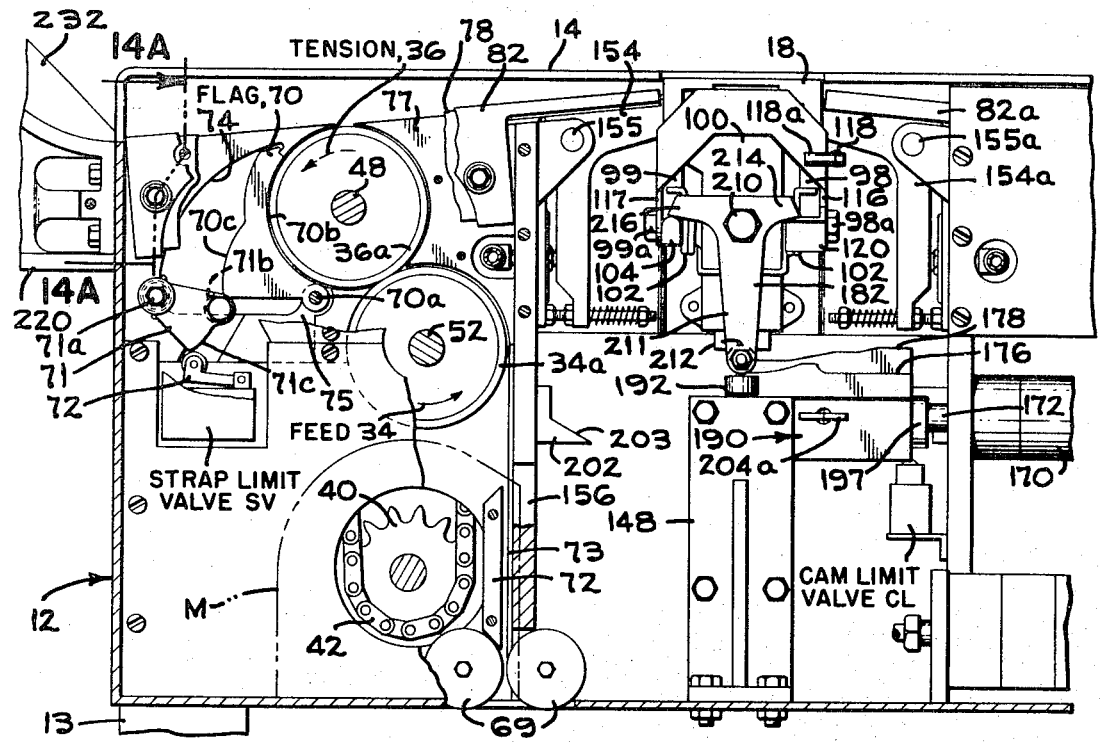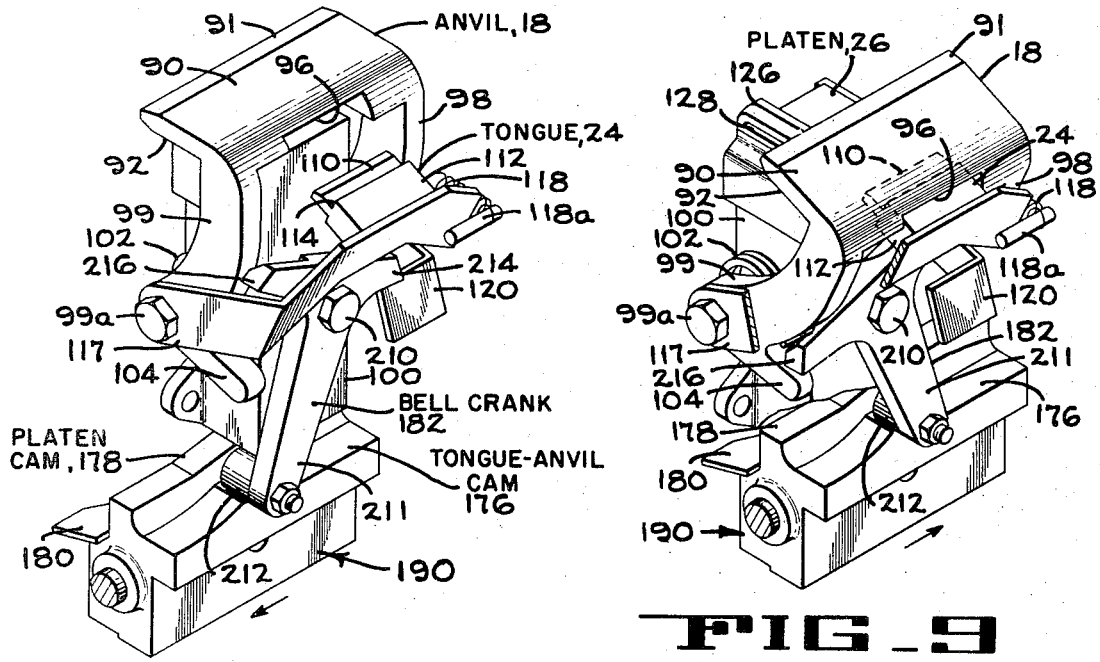

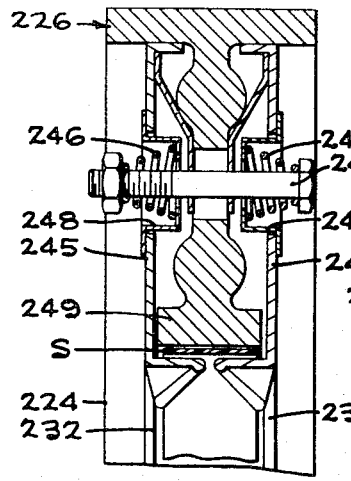
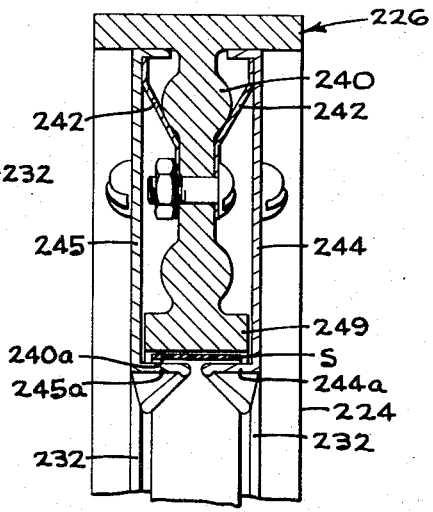
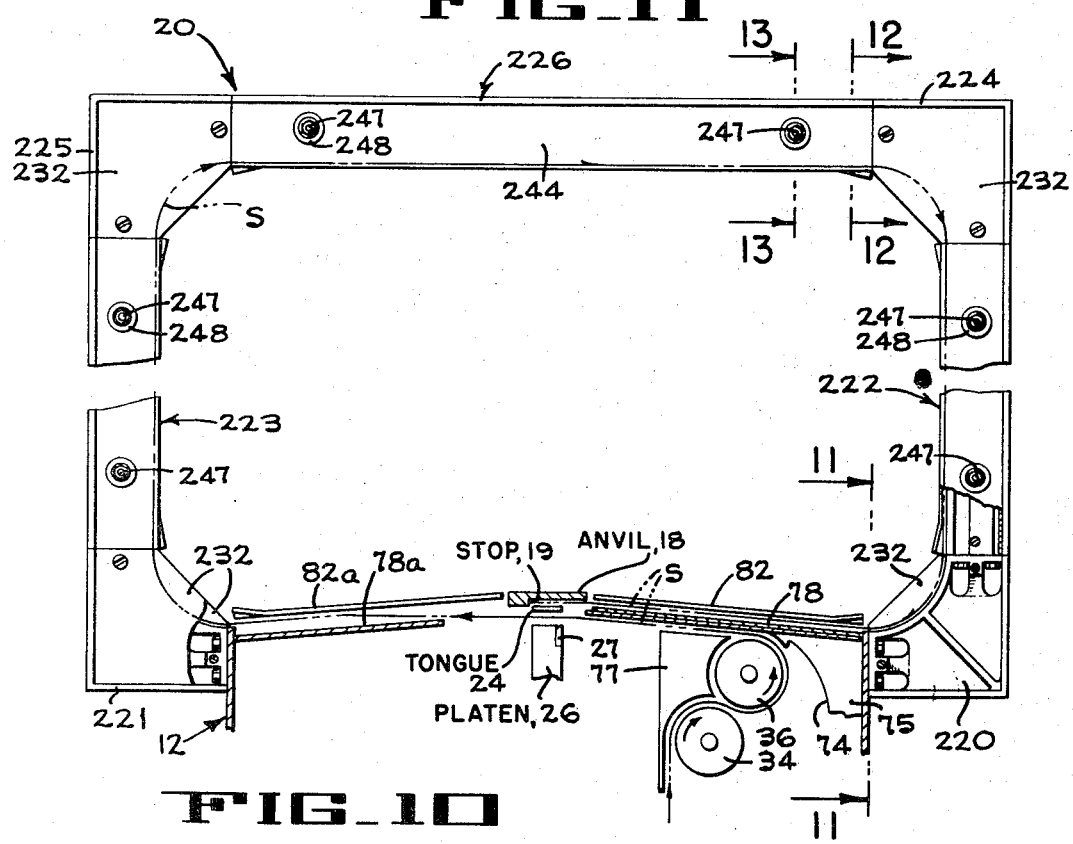

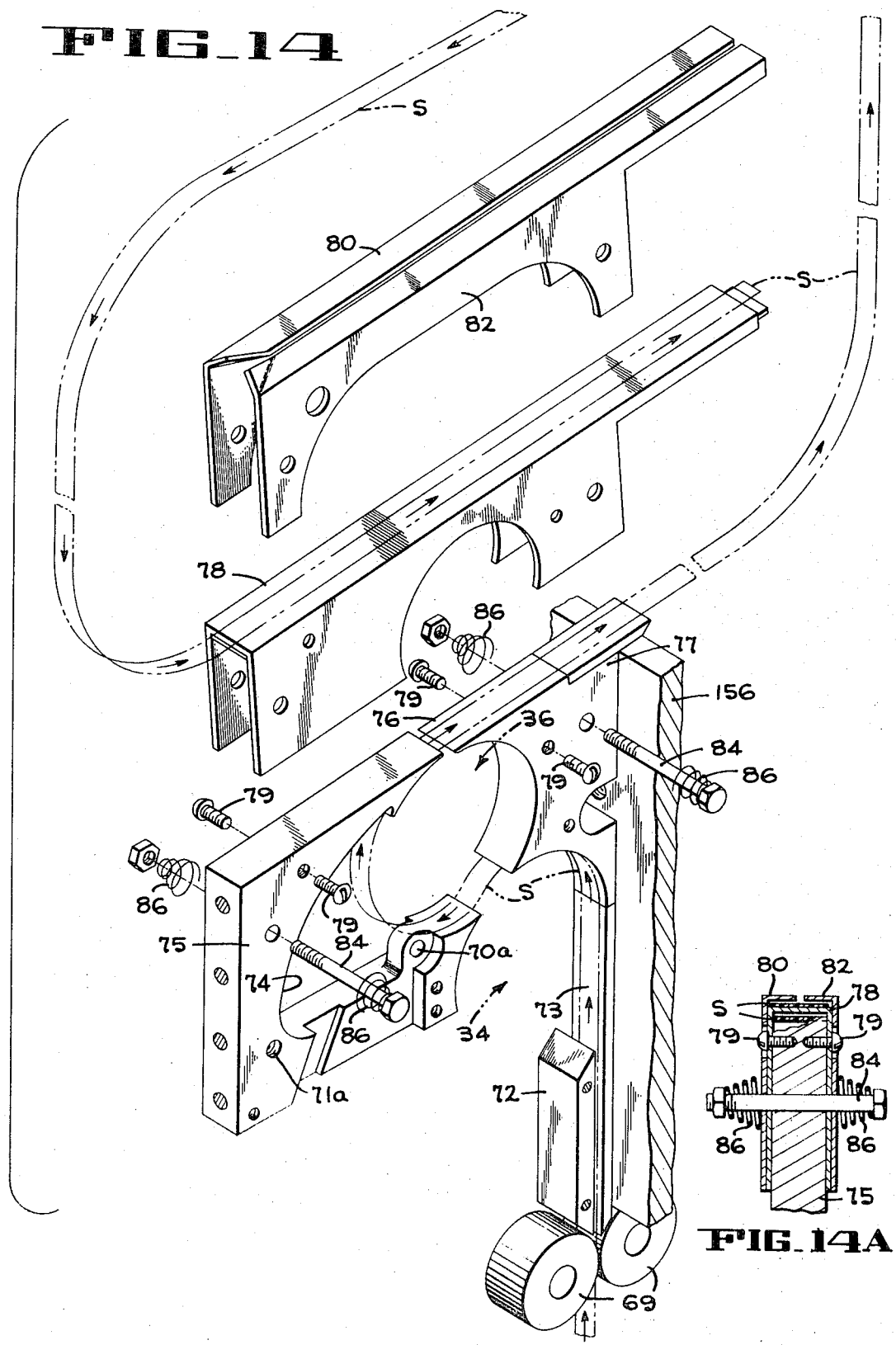

FIG. 15 (SEE FIG. 22)

FIG. 16 (SEE FIG. 23)

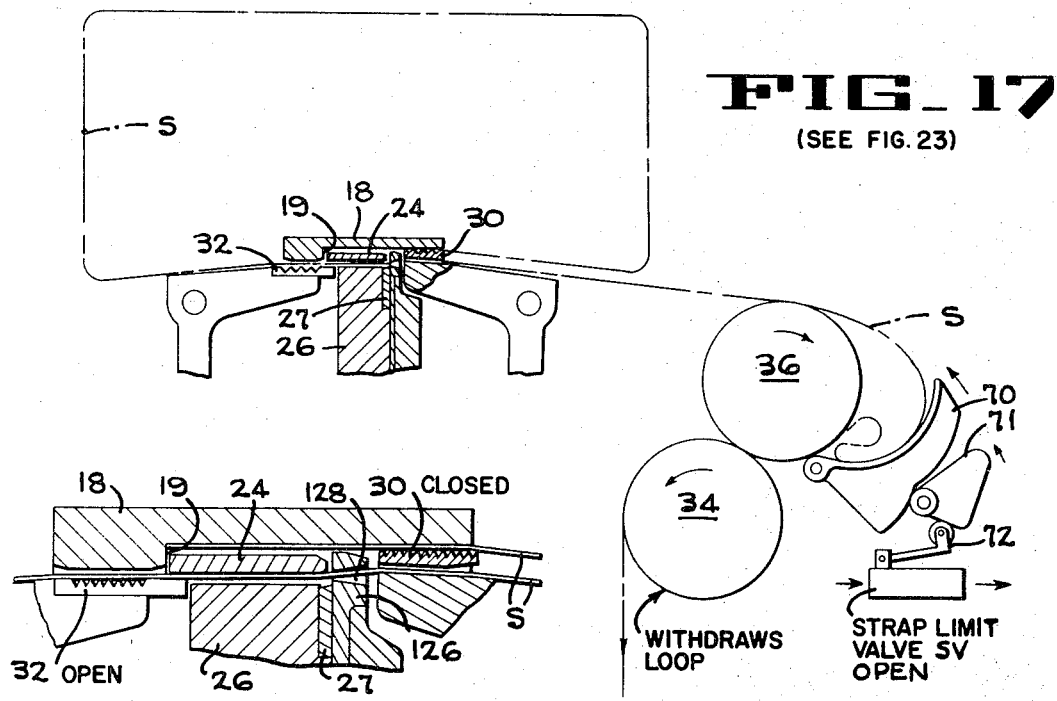
FIG_17 (SEE FIG.23)
FIG_17A
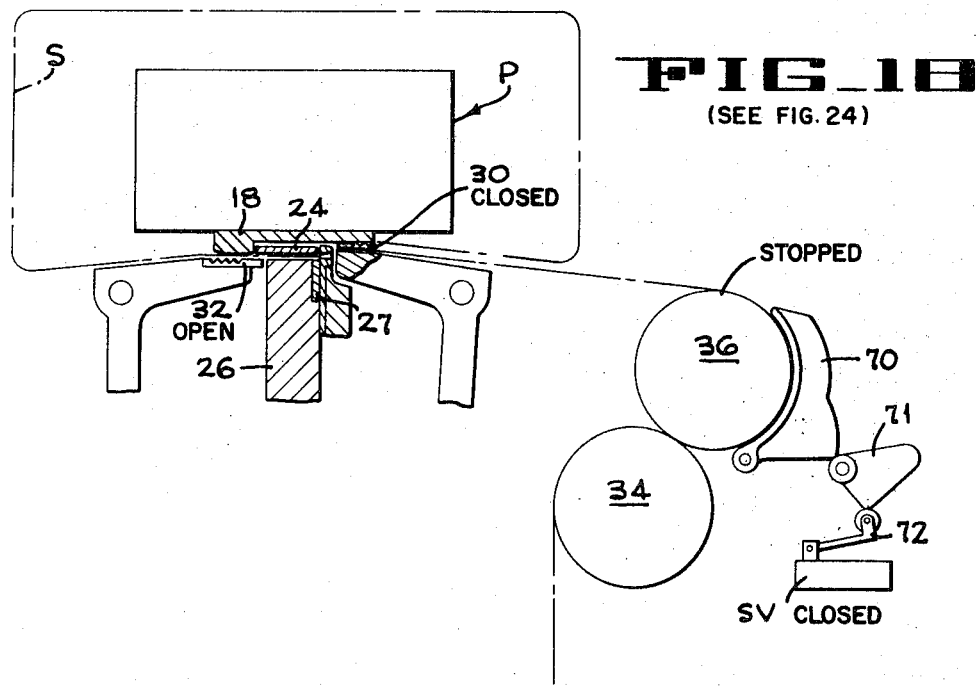
FIG_18 (SEE FIG.24)

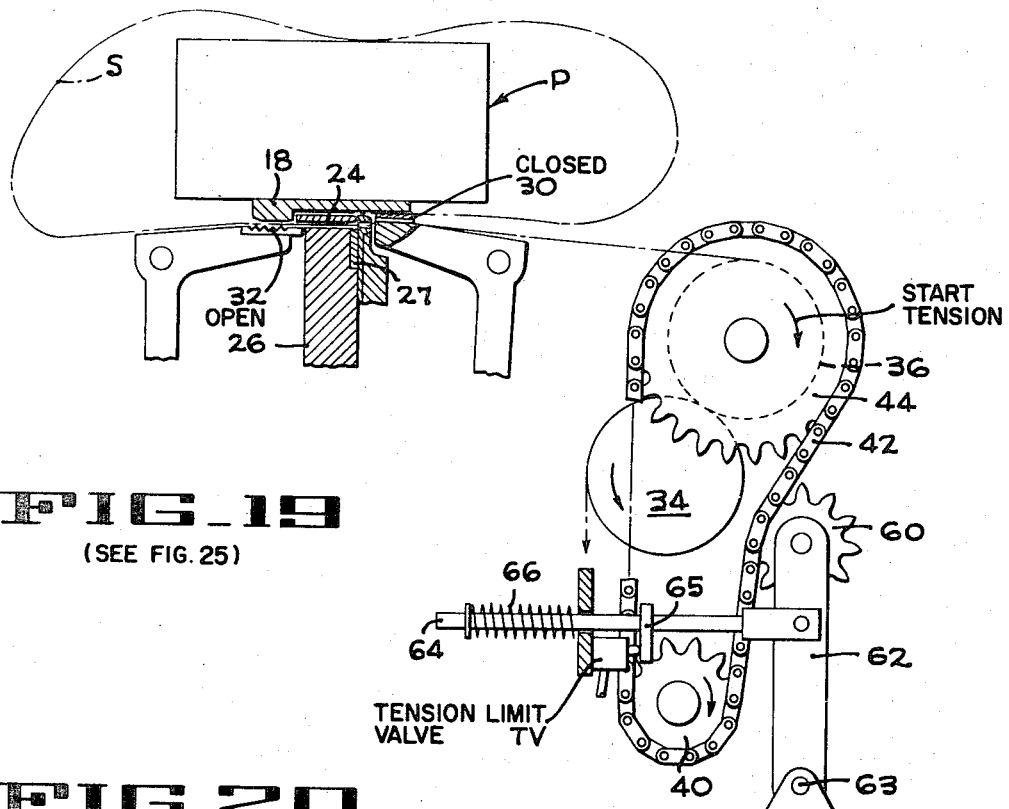
FIG_19
(SEE FIG. 25)
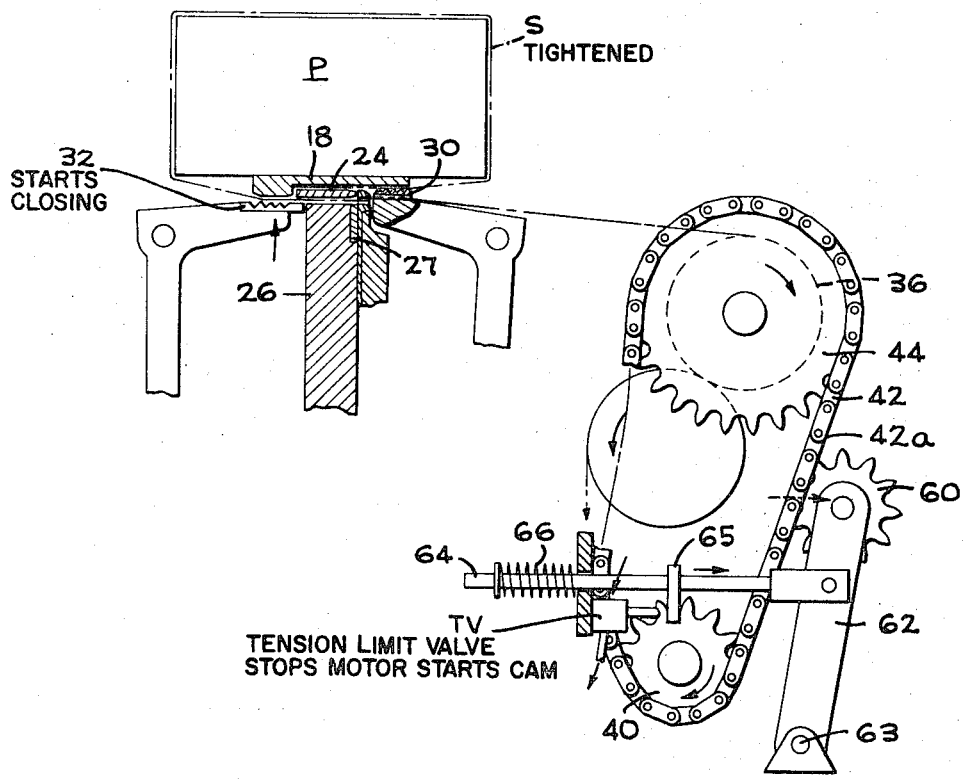
FIG_20
(SEE FIG. 26)

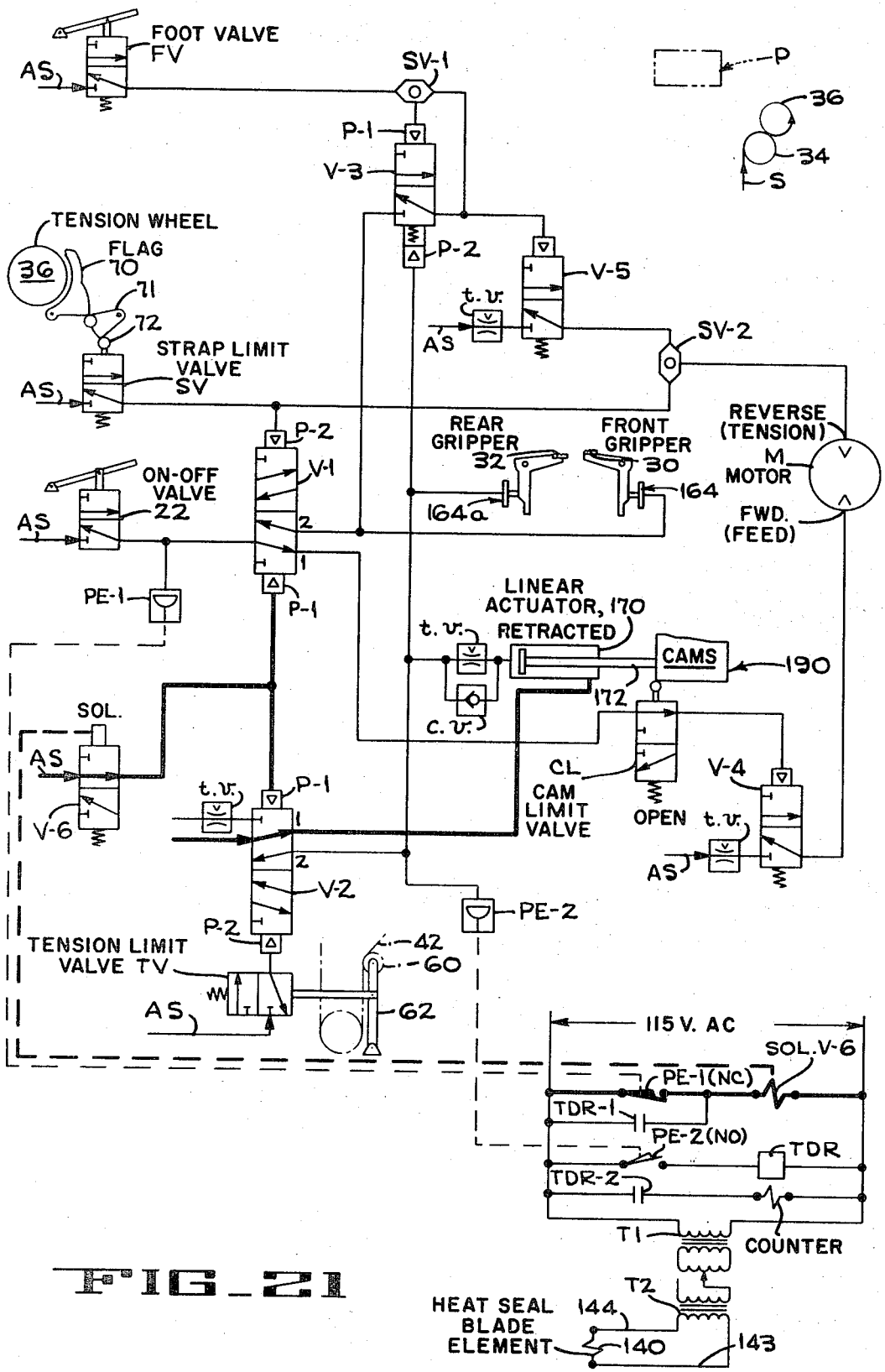
FIG_21

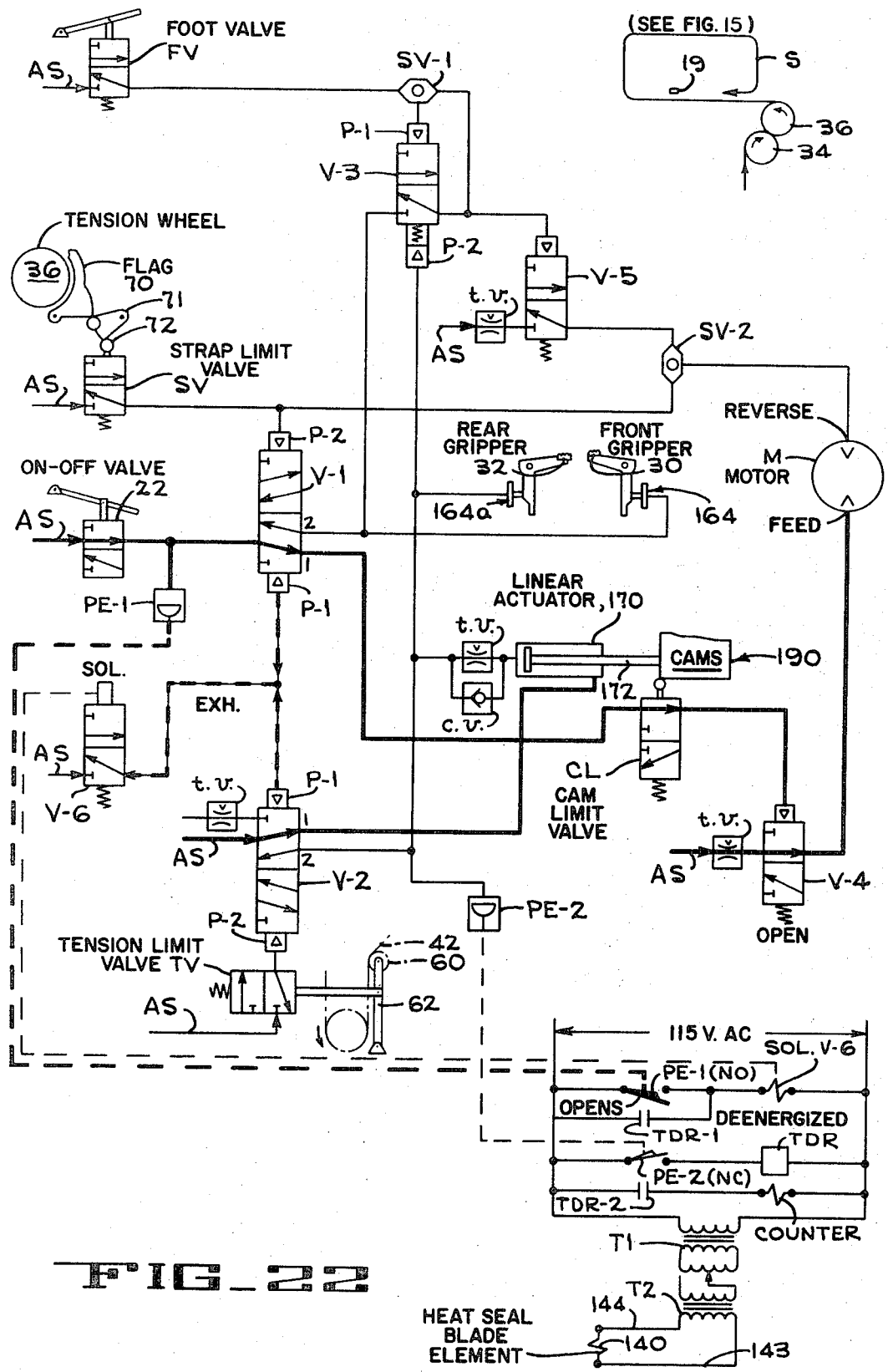
FIG_22

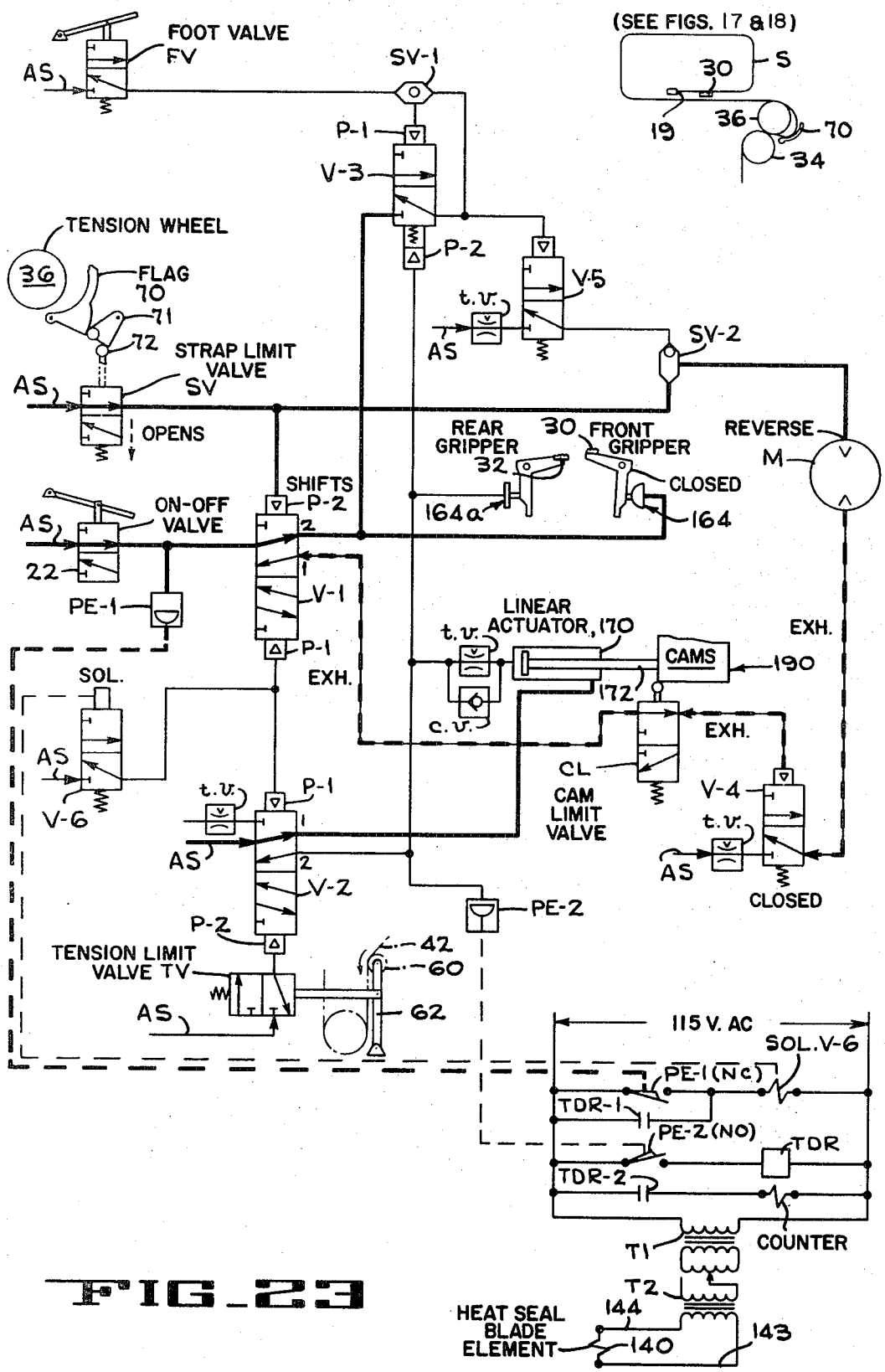
FIG_23

STRAPPING MACHINE FEED

REFERENCE TO RELATED APPLICATION

This application is a division of Goodley, Ser. No. 198,862, filed Nov. 15, 1971 and assigned to the FMC Corporation now U.S. Pat. No. 3,759,169 which issued Sept. 19, 1973.

Application Ser. No. 332,499, filed Feb. 14, 1973 is also a division of the aforesaid Goodley parent application and has claims directed to control of the strap feed mechanism.

FIELD OF THE INVENTION

This invention relates to apparatus for strapping articles such as packages and more particularly to an improved strap feeder in a machine for strapping the packages with heat sealable plastic tape.

DESCRIPTION OF PRIOR ART

The apparatus of the present invention is an improvement over the U.S. Pat. to Billett et al., No. 3,269,300, Aug. 30, 1966. The improvements are so numerous and varied that they can only be made clear after an understanding based on the apparatus of the present invention.

The U.S. Pat. to Plattner, No. 3,590,729, July 6, 1971, shows a small diameter feed wheel geared to a large diameter tensioning wheel in a strapping machine with the strap wrapped less than 180° around the tensioning wheel and not wrapping around the feed wheel at all.

The U.S. Pat. to Rogers No. 2,880,666, Apr. 7, 1959 shows a tying machine for cord wherein the cord passes between geared together tensioning wheels without wrapping around either wheel.

BRIEF DESCRIPTION OF THE MACHINE

The mechanical features of the strapping machine of the present invention will be briefly summarized.

The strap transport of the present invention comprises a feed wheel and a tension wheel geared together. The feed wheel feeds the strap beneath a front gripper, between a side retractable tongue and a platen, between a rear gripper and a side retractable anvil, up around a yoke, back between the front gripper and the anvil, over the tongue and against a stop on the anvil. As claimed in a divisional application, Ser. No. 332,449, filed Feb. 14, 1973, a slight overfeed after the free end of the strap strikes the stop develops a loop, which closes the front gripper, reverses the feed motor to remove the overfeed loop and stops the feed motor.

The operator now operates a control valve which resumes reversal of the feed to tension the strap around a package within the yoke. As claimed in the parent application, after the strap has been tensioned, a rear gripper closes automatically to maintain the tension, and a linear cam actuator starts advancing. As a result of actuator advance and retraction, the tongue is retracted, a heated sealing blade replaces the tongue between the end of the bight of the strap, a platen presses the joint, the blade is withdrawn, the platen is raised further to squeeze the heated joint, the strap is cut off at the joint, the anvil and tongue are retracted together, the platen is lowered and the strapped package can now be removed. The anvil and tongue are automatically returned to their initial positions and upon full retraction of the actuator the feed is automatically restarted and stopped in the manner described above.

SUMMARY OF THE INVENTION

Referring principally to FIGS. 2, 3, 4 and 7, a reversible air motor has a sprocket driving a chain and a sprocket on the shaft of the strapping tension wheel. The other end of the tension wheel shaft mounts a gear which is meshed with a gear of the same pitch diameter on the shaft 52 of a feed wheel. The feed and tension wheels are covered with friction bands formed of polyurethane elastomer. The strap is gripped between the feed and tension wheels, but it wraps around the feed wheel for something over 90° and around the tension wheel for something over 180°. The angular wrap around the feed wheel is adequate to feed the strap through the required path and the angular wrap around the tension wheel is adequate to tightly tension the strap around the package before sealing the joint in the strap.

BRIEF DESCRIPTION OF THE DRAWINGS

FIG. 1 is an overall view of the strapping machine embodying the invention.

FIG. 2 is a horizontal section of the machine taken on line 2 — 2 of FIG. 1 with parts broken away.

FIG. 2A is a schematic diagram showing the threading of strap through the machine.

FIG. 3 is a perspective of the feed and tensioning mechanism of the present invention.

FIG. 4 is a side view of the front of a machine with parts broken away.

FIG. 4A is a horizontal section of the strap tension valve operator taken along line 4A — 4A of FIG. 4.

FIG. 6 is an enlarged section taken on line 6 — 6 of FIG. 2.

FIG. 7 is a view from the rear of the machine taken on line 7 — 7 of FIG. 2.

FIGS. 8 and 9 are perspectives showing the tongue and anvil operation.

FIG. 10 is a diagram showing threading of the strap through certain parts of the machine, as well as yoke details.

FIGS. 11, 12 and 13 are sections through the yoke taken as indicated on FIG. 10.

FIG. 14 is an exploded perspective showing feeding of the strap through the feed wheel casing structure.

FIG. 14A is a section through the casing structure of FIG. 14, taken as indicated on FIG. 7.

FIGS. 15 to 20 are operational schematic diagrams illustrating the salient mechanical features of the invention at various portions of a cycle.

FIGS. 21 to 26 are control diagrams showing how the operations of FIGS. 15 - 20 are carried out in sequence.

DETAILED DESCRIPTION

Mechanical Features

Figure 5:
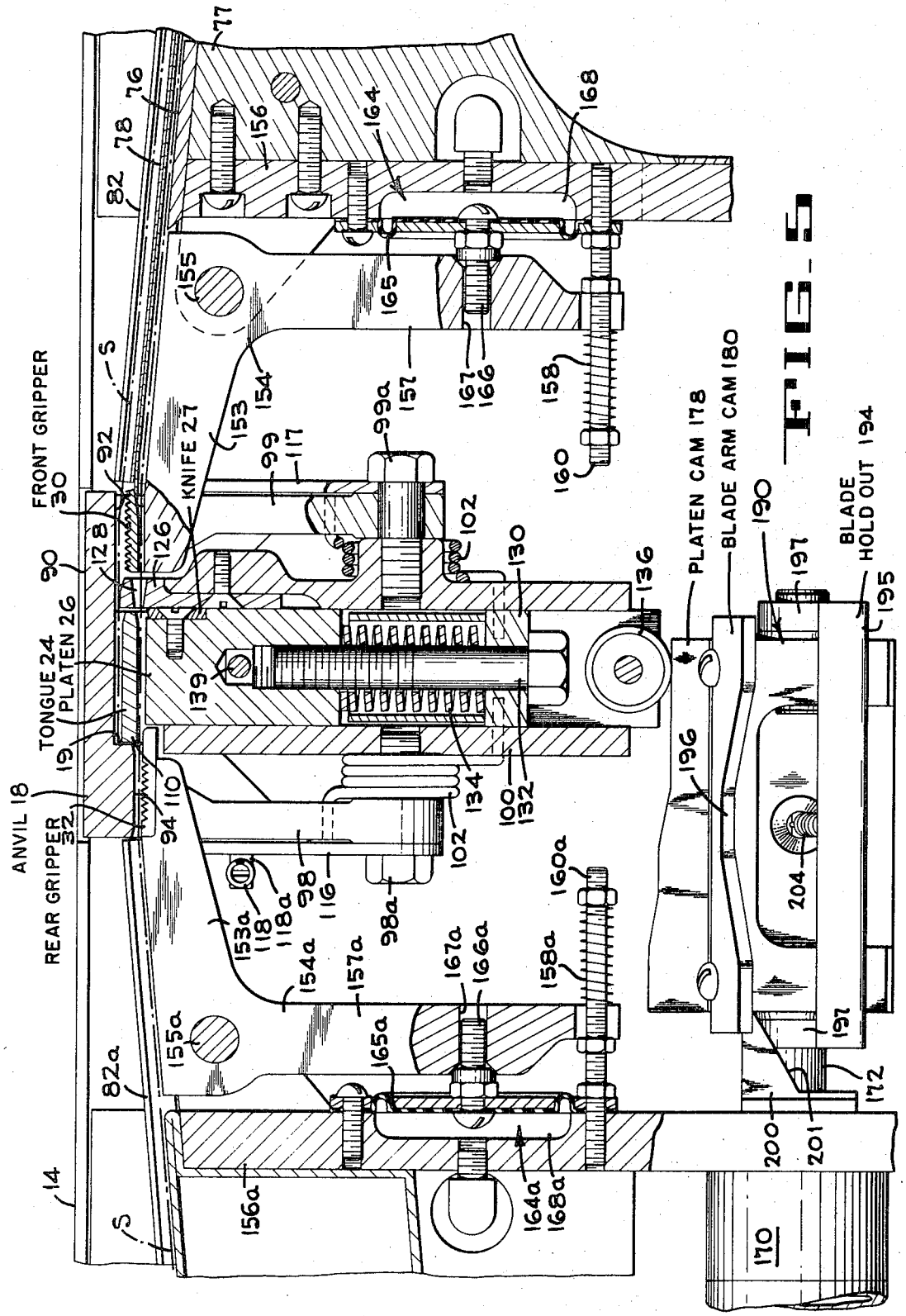
FIG. 5 is an enlarged section taken on line 5 — 5 of FIG. 2.

Referring to FIG. 1, the strapping machine of the present invention includes a main body or housing 12 supported on legs 13 and mounting a flat upper table 14. The table is slotted at 16 to accommodate tensioning of a strap around a package (not shown) on the table. A retractable anvil 18 (see also FIG. 6) is at the center of the table 14. The strap S is fed from a tape reel in a manner to be described in detail presently around a yoke 20 that surrounds the package. After the feed, the strap is tensioned against the package, a heat sealed joint is made, the strap is cut and the strapped package removed.

The break away plan view of FIG. 2 shows additional mechanical features. The anvil 18 is broken away in this view as is a retractable tongue 24 (best seen in FIG. 6) to expose a vertically reciprocating platen 26 that mounts a strap cutting knife 27 (see FIG. 5).

FIG. 2 also shows a heat sealing blade assembly indicated generally at 28 and illustrated in its retracted position. A side view of the blade appears in FIG. 6. Also appearing in FIG. 2 are a front gripper 30 and a rear gripper 32 for holding the ends and the bight of the strap respectively. These grippers are operated by bell cranks, as seen in FIG. 5.

A strap transport mechanism in the form of a pair of geared together feed and tension wheels appears in FIG. 3. The strap enters from below and is wrapped partially around a feed wheel 34, pinched between that wheel and a tension wheel 36, wrapped around the tension wheel and fed on through the mechanism.

FIG. 2A (a simplified diagram) shows the path of a strap through the apparatus. The strap enters the feed wheel 34 from the tape reel (FIG. 1) passes between the feed and the tension wheels 34, 36, wraps around the tension wheel 36, passes beneath the front gripper 30, passes beneath the tongue 24 and above the platen 26, passes between the rear gripper 32 and the anvil 18, is threaded through the yoke 20, traverses the entire yoke 20 passes between the front gripper 30 and the anvil 18, passes between the tongue 24 and the anvil 18, and abuts a stop 19 formed on the anvil.

Strap Transport Drive

Referring principally to FIGS. 2, 3, 4 and 7, the transport drive of the present invention includes a reversible air motor M has a sprocket 40, driving a chain 42, and a sprocket 44 on the shaft 46 for the tension wheel 36. The other end of the shaft 46 mounts a gear 48 which is meshed with a gear 50 of the same pitch diameter on the shaft 52 for the feed wheel 34. The feed and tension wheels 34, 36 are covered with friction bands 34a and 36a formed of 90 Durometer polyurethane elastomer. The strap S is gripped between the wheels 34, 36, but it wraps around the feed wheel 34 for something over 90° and around the tension wheel 36 for something over 180°. The wrap around the feed wheel 34 is adequate to feed the strap through the path shown in FIG. 2A and the wrap around the tension wheel 36 is adequate to tightly tension the strap around the package before sealing the joint in the strap.

In accordance with the invention of the aforesaid divisional application, Ser. No. 332,449 filed Feb. 14, 1973, in order to operate a tension limit valve TV, for stopping the tensioning of the strap around the package, and to initiate other functions to be described presently, an idler sprocket 60 (FIGS. 3, 4 and 4A) is mounted on an arm 62 pivoted to the frame at 63 and connected to a link 64. A compression spring 66 that is compressed between a nut on the link 64 and a frame element 67 (FIGS. 4 and 4A) is used for taking up the slack in the chain 42. The idler link 64 also mounts a tab 65 (FIGS. 4 and 4A) which is held against the operating button of the tension limit air valve TV, the construction being that the valve TV is closed when there is a slack in the reach 42a of the chain 42 engaged by the idler sprocket 60. This slack occurs when the motor M is driving the wheels in the feed direction illustrated by the solid arrow on the wheel 34 in FIG. 3. The slack tends to be removed from the idler side 42a of the chain 42 when the motor M is reversed to drive the tension wheel 36 in the tension direction indicated on that wheel by the dashed arrow in FIG. 3. When the strap is tight around the package, the side 42a of the chain becomes taught, swinging out the idler arm 62, and pulling the tab 65 away from the tension limit valve TV. This opens the air valve for stopping the motor M and for other purposes to be described presently. Opening of the valve TV only takes place upon the generation of a predetermined amount of torque required to drive the tensioning wheel 36, which torque is sufficient to adequately tension the strap around the article. Hence the action just described does not stop the motor M from drive in the tensioning direction until the package is tightly strapped.

Overrun Flag

As seen in FIG. 7, an overrun flag 70 is provided at the tension wheel 36 for sensing a loop in the strap that develops during the feeding operation and causing the loop to be removed before the strap is tensioned about an article.

The flag 70 is pivoted at 70a to a plate 75 (shown in perspective in FIG. 14) and has a loop sensing surface 70b that is contoured to fit the tension wheel 36. The flag 70 has a cam surface 70c for operating a cam follower 71. The follower 71 is pivoted to the plate 75 at 71a and has a follower roller 71b for depression by the cam surface 70c of the flag 70. The follower 71 has a cam surface 71c for depressing the operating arm 72 of a strap limit valve SV, which occurs when the flag 70 is displaced by development of a loop as will be explained in detail presently.

FIG. 14 shows additional details of the housing and guide mechanisms associated with the transport wheels. The strap enters between the guide rollers 69 (see also FIGS. 4 and 7), passes between vertical guides 72, 73 and wraps something over 90° around the feed wheel 34, the position only of which is illustrated in FIG. 14. The strap S then passes between the nip of the wheels 34 and 36 wrapping more than 180° around the tension wheel 36 (also not shown) passing a pocket 74 for the flag 70, just described. The strap leaves the tension wheel 36 and passes over the top of the upper surface 76 of a plate 77, passes beneath the front gripper 30, passes beneath the tongue 24 and above the platen 26, passes between the rear gripper 32 and the anvil 18 and on through the yoke 20 (not shown). After emerging from the yoke, the strap rides over the upper surface of a shoe plate 78, beneath a pair of spring loaded release guide rails 80, 82 and on to the stop 19 on the anvil 18 (not shown), as previously described.

As seen in FIG. 14A, the U-shaped guide 78 is secured to the plate 75 by screws 79 and the spring guides 80, 82 are resiliently held in place by two bolts 84 and compression springs 86. Thus, an upward pull on the strap S will spread the guides 80, 82 and permit the strap to become free of the guide structure.

As seen at the left of FIGS. 2 and 10 a similar guide and release structure is provided for the strap entering the yoke 20, wherein spring loaded release guides 80a, 82a are mounted above a fixed guide 78a in a manner analogous to that of FIG. 14A. The purpose of these releases is to permit the strap to clear these guides during final tensioning about an article whereupon the strap is also pulled up through the slots 16 in the table 14 (FIG. 1) and against the package.

Anvil

The anvil 18 has a horizontal platform portion 90 (FIGS. 6, 8 and 9) with a beveled nose 91. The platform 90 has a lower surface 92 for cooperation with the front gripper 30 (FIG. 5) and an offset lower surface 94 for cooperation with the rear gripper 32, these surfaces being jointed by the aforesaid strap stop shoulder 19. The anvil plate 90 is notched at 96 to receive a portion of the tongue 24 (FIGS. 6, 8 and 9).

The anvil is pivotally mounted for side retraction by means of side arms 98 and 99 which are mounted on pivot bolts 98a, 99a secured to a fixed frame portion 100 which also forms a slide housing for the platen 26. Torsion springs 102 (FIG. 5) are connected between the frame portion 100 and the arms 98, 99 of the anvil for urging the anvil toward its inward or advanced position of FIG. 6. An anvil operating finger 104 projects rearwardly from the anvil arm 99 (FIGS. 8 and 9) which finger serves as an operator for retraction of the anvil by a double bell crank 182, to be described in detail later, and which is shown in FIG. 9.

FIGS. 5, 6 and 8 show the anvil in its advanced or "in" position for cooperation with the grippers during tightening of the strap and FIG. 9 shows the anvil in its retracted position for removal of the strapped package.

Tongue

The tongue, indicated generally at 24, serves as a retractable guide between the end of the strap and the bight of the strap as seen in FIG. 5, but the tongue is retractable so that the heat sealing blade 28 can be inserted in the sapce previously occupied by the tongue.

As seen in FIG. 6, the tongue 24 has a thin terminal flange 110 that lies beneath the anvil surface 92 and above the top of the platen 26 to provide two spaces for passing the strap (FIG. 5). The portion 110 is joined to a thicker portion 112 in a manner which forms a shoulder 114 (FIG. 6) for engaging a complimentary shoulder formed by the notch 96 on the anvil 18, so that retraction of the anvil also retracts the tongue.

The tongue portions just described are pivotally supported on side plates 116, 117 (FIGS. 5 and 8), these plates being pivotally mounted on the bolts 98a, 99a that mount the underlying support arms 98, 99 for the anvil. The tongue is urged toward its inward or advanced position by a tension spring 118, connected between a finger 118a on the tongue structure (FIGS. 2 and 5) and a fixed cross plate 119 within the main housing 12. The tongue 24 is mechanically retracted indepenently of the anvil by depressing a finger 120 (FIGS. 7, 8 and 9) projecting from the tongue side arm 116. The tongue-operating finger 120 is also operated by the aforementioned bell crank 182, as will be described presently, and which can be seen in FIG. 8.

Platen

The platen 26 is raised, first to squeeze the strap parts against the sealing blade and then to squeeze the heated joint after retraction of the heat sealing blade 28, to make the seal. As best seen in FIGS. 5 and 6, the platen slides vertically in the housing portion 100, previously mentioned, which is in the form of a U-shaped channel screwed to an offset 119a in the cross plate 119 (FIGS. 2 and 6). As previously mentioned, the platen 26 carries a knife 27 which slides along a shear plate 126 (FIG. 5) that is apertured at 128 to receive the strap on its way to the yoke, between the tongue portion 110 and the platen.

The platen 26 is actuated in a manner which gives resilient relief upon cam lifting thereof against the joint. To this end a lower portion 130 of the platen assembly (FIGS. 5 and 6) is slidably mounted in the housing 100 and on a bolt 132 screwed into the platen 26, and the platen parts 26, 130 are urged apart by a compression spring 134. The lower platen element 130 carries a cam follower roller 136 for operation by a linear platen cam 178, in a manner to be described. Thus when the platen 26 is squeezed up against the strap portions to form the joint, slight overtravel of the lower platen portion 130 in response to the cam 178 will be accommodated by the spring 134.

The platen assembly 26, 130 is urged downwardly to hold the platen roller 136 against its cam 178 by a tension spring 138 connected to a spring post 139 on the platen and a fixed anchor 139a (FIG. 6).

Heat Seal Blade

The heat seal blade assembly 28, the function of which was previously described, includes a thin, sinuous resistance element 140 (FIGS. 2, 4 and 6) mounted on an insulator 142 and connected across to power supply leads 143 (FIG. 6) and 144 (see the wiring diagram in the control circuit of FIG. 21) details of these connections are not critical to the present invention. The connections 143, 144 to the element 140 are indicated schematically in FIG. 21. The element 140 is mounted on a swinging arm 146 (FIG. 6) pivoted at 147 to frame structure 148 in the main housing. The blade assembly 28 is normally held in its retracted position of FIG. 6 by a cam 180 (FIG. 6) but is spring urged into the heat sealing position by a torsion spring 150 whose arms engage the blade arm 146 and the frame portion 148. The blade arm 146 is mechanically retracted by a cam follower roller 152 (FIG. 6) secured to a bracket 152a on the arm 146. The roller 152 is operated by the linear cam 180, which advances and retracts the blade 28, as will be described presently.

Grippers

The front gripper 30 grips the free end of the strap against the surface 92 of the anvil 18 (FIG. 5) whereupon the strap is tensioned around the package and the rear gripper 32 grips the bight of the strap against the surface 94 of the anvil. The corrugated gripping jaw of the front gripper 30 is at the free end of an arm 153 of a bell crank 154 pivoted at 155 to ears projecting from a fixed plate 156 (FIG. 5). The lower arm 157 of the gripper bell crank 154 is urged to hold the gripper 30 in its retracted position by a compression spring 158 (FIG. 5) compressed between a nut on a bolt 160 mounted in the plate 156 and the lower end of the gripper bell crank arm 157.

The front gripper jaw 30 is raised to grip the free end of the strap by a pneumatic diaphragm actuator indicated generally at 164 (FIG. 5) which actuator has a diaphragm 165 screwed in air tight relation to the frame portion 156. The diaphram 165 actuates the bell crank 154 through a screw 166 that protrudes into a hole 167 in the bell crank arm 157. An air chamber 168 for the diaphragm 165 is formed in the mounting plate 156.

Diaphragm actuators of this type are well known in the art and details thereof are not critical to the present invention. In fact, the actuator could be replaced by a piston and cylinder assembly if desired.

The rear gripper 32 grips the bight of the strap against the surface 94 of the anvil 18 (FIG. 5). The parts of this gripper correspond to those of the front gripper and hence corresponding reference numbers with the letter (a) appended are utilized for the gripper parts.

Linear Actuator and Cam Assembly

As previously mentioned, the anvil 18, tongue 24, platen 26 and the blade 28 are all mechanically operated by a linear actuator and cam assembly forming the subject matter of the parent application. The linear actuator shown is a double acting pneumatic cylinder and piston assembly indicated generally at 170. The piston rod of the cylinder is indicated at 172 (FIG. 7) and mounts a cam block 190 which supports a tongue-anvil cam 176 (FIG. 8), a platen cam 178 and a blade cam 180 (FIGS. 4, 5, 6 and 8). The platen cam 178 operates the platen assembly follower roller 136 (FIGS. 5 and 6). The tongue-anvil cam 176 operates the tongue-anvil bell crank 182 (FIGS. 6, 8 and 9). The blade cam 180 operates the blade follower roller 152 (FIG. 6). The cam block itself, indicated generally at 190, has rear and lower slide surfaces guided by rollers 192, 193, on the frame post 148 (FIG. 6), which absorb the thrust of the various springs and cam follower rollers actuated by the respective cams. When the cam block 190 is in its fully retracted position, it opens a cam limit valve CL (FIGS. 4 and 7) for reinitiating a feed cycle of the strap, as will be described presently. Details of the operation of the cams on the cam block 190 are not critical to the present invention and are described in the parent application.

Bell Crank

The bell crank 182 previously mentioned is pivoted to the platen slide 100 by a pivot bolt 210 (FIGS. 6 and 7) and is in the form of a T-shaped member. The leg 211 of the T mounts a cam follower roller 212 for operation by the tongue-anvil cam 176. The bell crank cross bar has one arm 214 for operating the tongue withdrawal finger 120 (FIG. 8). The other arm 216 of the bell crank crossbar operates finger 104 for withdrawing the anvil, along with the tongue 24, (FIG. 9). The bell crank is urged toward its centered position (the position of FIG. 7) by a torsion spring 218 (FIG. 6) connected between the frame slide 100 and the bell crank in a conventional manner.

Yoke Details

As seen in FIG. 10, the yoke 20 is mounted on the housing 12 by lower angle brackets 220, 221. Connected to these brackets, vertical legs 222, 223, upper angle brackets 224, 225 and an upper horizontal leg 226. The section of FIG. 15 shows how the strap S bends around the angle bracket 220 and rides between retractable side channels 230, 231. Side plates 232 flank all the angle brackets.

The section of FIG. 12 shows the construction of the upper leg 226, but is typical of the vertical legs 222, 223 also. A rigid T member 240 has spacers 242 secured thereto guiding the upper edges of retractable side guides 244, 245. The strap S is guided between the lower surface 240a of the T, 240 and inturned flanges 244a, 245a of the retractable side guides. FIG. 13 shows how the retractable side guides 244, 245 are resiliently urged together by compression springs 246, held in place by bolts 247 and bearing against cups 248 in the guides 244, 245. The lower ends of the guides 244, 245 are spaced by a flange 249 on the leg of the T 240. The side guides for the vertical legs 222, 223 are mounted in a similar manner and are thus designated by the numbers 247 applied to the spring mounting bolts. With this construction, when the strap is tightened against the package, it simply pulls the spring loaded guide channels laterally apart and slips out from between these channels without damage. The manner in which the straps clear the spring mounted guides 80, 82 and 80a, 82a has been previously described.

Control Circuit Elements

Before describing the sequence of an operational cycle, the more significant control elements will be briefly mentioned in order to avoid interrupting the cycle description with a characterization of these elements. The principal control circuit elements are shown in FIG. 21 (for example).

Foot Valve — FV

This is a spring closed three way valve that is momentarily opened by the operator. Its function is to initiate tensioning of a strap about a package and is the only control required for operation of the machine once it is started.

Strap Limit Valve — SV

This is a spring closed three way valve that is operated by the tension wheel flag 70. It has the following functions:
 a. Stops the feed.
 b. Closes the front gripper.
 c. Reverses the feed motor to withdraw overfeed.
 d. Stops the feed motor reverse.

On-Off Valve, 22

This valve, under control of the operator, is provided in order to set up an air supply to certain elements of the control system when the machine is ready for operation.

Tension Limit Valve — TV

This is a three way valve that is spring opened and mechanically closed by the chain idler 60.
 Its functions are:
 a. Stop the tensioning drive.
 b. Start linear cam actuator advance.
 c. Close the rear gripper.
 d. Start the timer TDR for subsequently retracting the linear actuator.

Cam Limit Valve — CL

This is a three way valve that is spring closed and mechanically opened by the linear actuator cam block 190. Its function is to start the feed upon retraction of the linear actuator and to prevent inadvertantly restarting the feed until the actuator has fully advanced and retracted.

Valves V-1, V-2

These are four way valves, air pilot positioned in either direction. After having been operated by one pilot, they remain in that position until they respond to the opposite pilot.

Valve V-3

This is a three way, double pilot operated valve, When operated by the pilot P-2 in one direction this operation is spring assisted to override any counter-pressure that might be placed on the other pilot, P-1.

Valves V-4, V-5

These are three way valves and are spring urged in one direction and pilot operated in the other direction.

Valve V-6

This three way valve is spring urged in one direction and solenoid operated in the other direction.

Indicated on the diagram are variable throttle valves t.v. of conventional design which can control the flow of air therethrough in accordance with their adjustment.

Also shown are shuttle valves SV-1 and SV-2 which are of conventional design and provide the usual shuttle valve function.

PE-1, PE-2

These are pressure operated electric switches of conventional design, the switch part being shown separated from the pneumatic operator in the drawings.

Timer TDR

This is a conventional timer such as the Guardian Time Delay Relay, manufactured by the Guardian California Company of Culver City, Calif., USA, Model 1R-BDT-O-10 115 vac. When the timer TDR is energized it starts timing out. When it times out it closes normally open contacts TDR-1 and TDR-2. When the timer is de-energized, the aforesaid normally open contacts are reopened.

Operation of a Cycle

The operation of the feed and tensioning operations of the strapping machine of the present invention during one cycle will be described in connection with the mechanical diagram of FIGS. 15 to 20. These figures including auxiliary figures and enlarged views will be described in conjunction with FIGS. 21 to 26 which are sequence diagrams of the control circuit. There is not always a one to one correspondence between the mechanical operational diagram of FIGS. 15-20 and the control diagrams of FIGS. 21 - 26 because such a correspondence would result in unnecessary duplication of figures.

Ready to Start

Referring to the control diagram of FIG. 21, it will be assumed that the strap S has been fed between the feed and tension wheels 34, 36. The package P may or may not be on the machine table at this time. It will be assumed that the electrical control circuit is energized and that an air supply has been connected to the air supply lines AS, leading to the various valves in the control circuit. In the condition of FIG. 21, the on-off air valve 22 is in its off condition, so that the pressure switch PE-1 is not pressurized and hence the normally closed contacts PE-1 (NC) of that switch are closed. This energizes the solenoid for air valve V-6 and moves that valve against its spring so that the air supply admits air to the pilots P1 for both valves V-1 and V-2, positioning them as shown. The output port 1 of V-2 now directs air to the rod end of the linear cam cylinder 170, which is either already in its retracted position or will immediately return to that position. When the cylinder 170 is in the retracted position shown in FIG. 21, the cam block 190 mechanically holds the cam limit valve CL in its open position, but with the on-off valve closed no air is directed to the valve CL so it is merely conditioned for the next operational step. The strapping machine is now ready to operate.

Strap Feeding

Figure 15A:
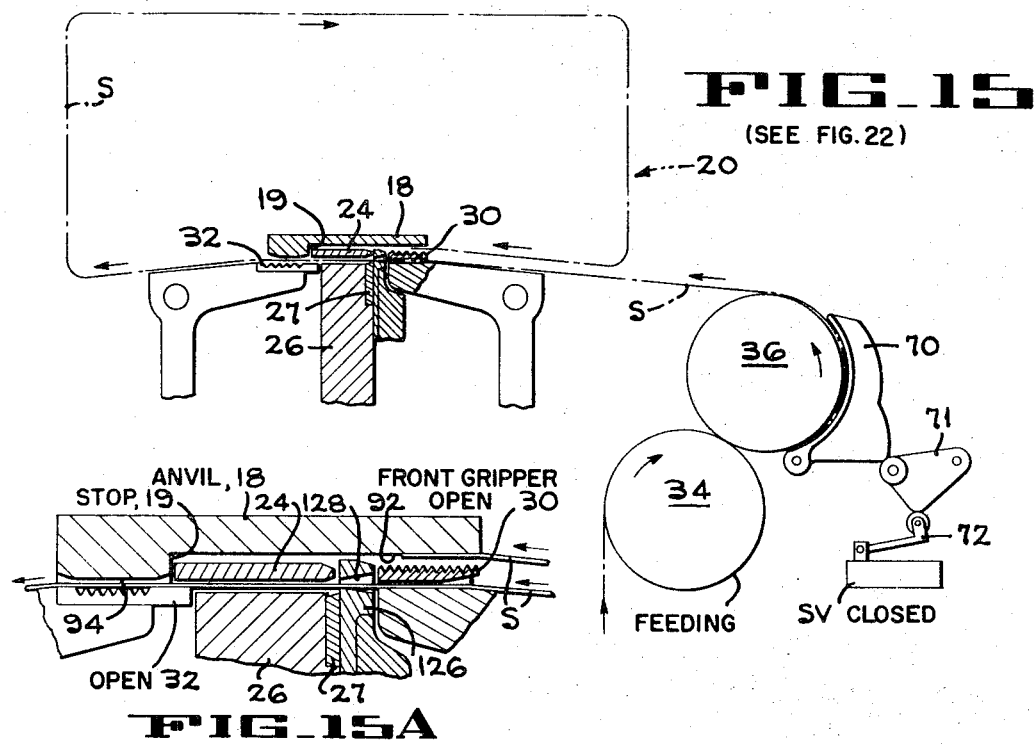

FIGS. 15 and 22 illustrate the strap feeding portion of the cycle. Referring to FIG. 22, the operator will have moved the on off air valve 22 to its on position and normally it will be left in this position during the operating period of the machine. Air is now admitted to the pressure switch PE-1, which opens the normally closed contacts PE-1 (NC), de-energizing the solenoid for valve V-6, so that the spring shifts V-6 to the position of FIG. 22. This connects the pilots P-1 for both valves V-1 and V-2 to exhaust, but these valves will remain in the positions to which they had previously been shifted. When the on-off valve 22 was opened, air under pressure was admitted to V-1, for the first time and its output port 1 conducts air through the cam limit valve CL (held open by the linear actuator cam block 190) thereby admitting air to the pilot of valve V4, which is thereby opened. Air from the air supply passes through an adjustable throttle valve t.v. and through the valve V-4 to the feed port of the reversible feed drive motor M. As seen at the upper right of FIG. 22 and in FIG. 15 and 15A, during the feeding process the strap is fed through the channels, around the yoke 20 and between the open front gripper 30 and the anvil 18 towards the stop 19.

Strap Limit Valve Actuation

Figure 16A:
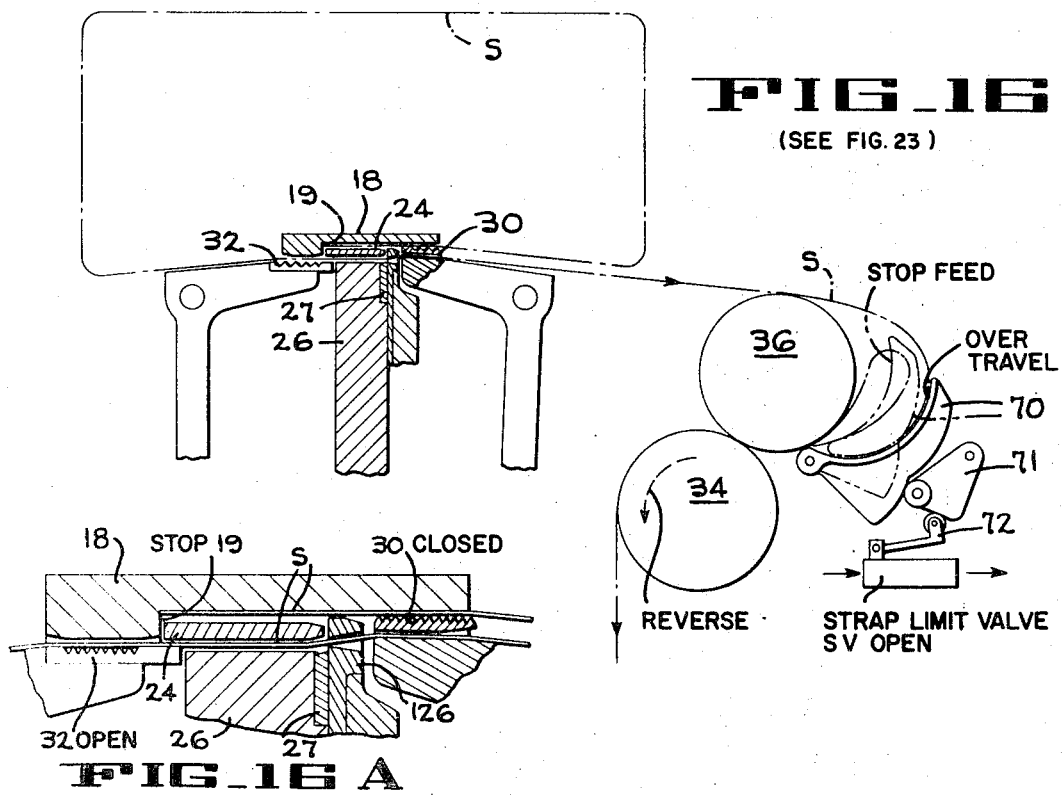

In FIGS. 16 and 16A, the strap has been fed until its end strikes the stop 19 on the anvil 18. Feeding continues, but a loop of strap develops at the tension wheel 36 behind the flag 70. This loop pivots the flag 70 to the right as seen in the FIG. 16, to an intermediate "stop feed" position illustrated in dotted lines. At this position, the flag 70 and its follower 71 have moved the strap limit valve operator 72 to a position wherein the strap limit valve is open.

Referring to control FIG. 23, when the strap limit valve SV is open, air is admitted to the pilot P-2 of valve V-1 which shifts that valve and opens the pilot of V-4 to exhaust through the cam limit valve CL and the port 1 of valve V-1. This causes V-4 to close, exhausting and hence stopping the drive of the motor M in the feed direction. Simultaneously, air from the strap limit valve SV passes through the shuttle valve SV-2 to the reverse line of the feed motor M but due to the momentum of the parts, reversal of the feed is not accomplished instantly and there is some overtravel of the flag 70, as indicated in FIG. 16. Also, at this time, output port 2 of valve V-1 admits air to the gripper diaphragm 164, closing the front gripper 30 thereby trapping the strap against the anvil so that it cannot be withdrawn by removal of the over travel loop.

The motor M soon reverses and begins to withdraw the loop from in front of the flag 70, as indicated in FIG. 17. This loop withdrawal continues until the flag 70 has returned to its initial condition and the strap limit valve SV is closed, as shown in FIG. 18.

Figure 24:
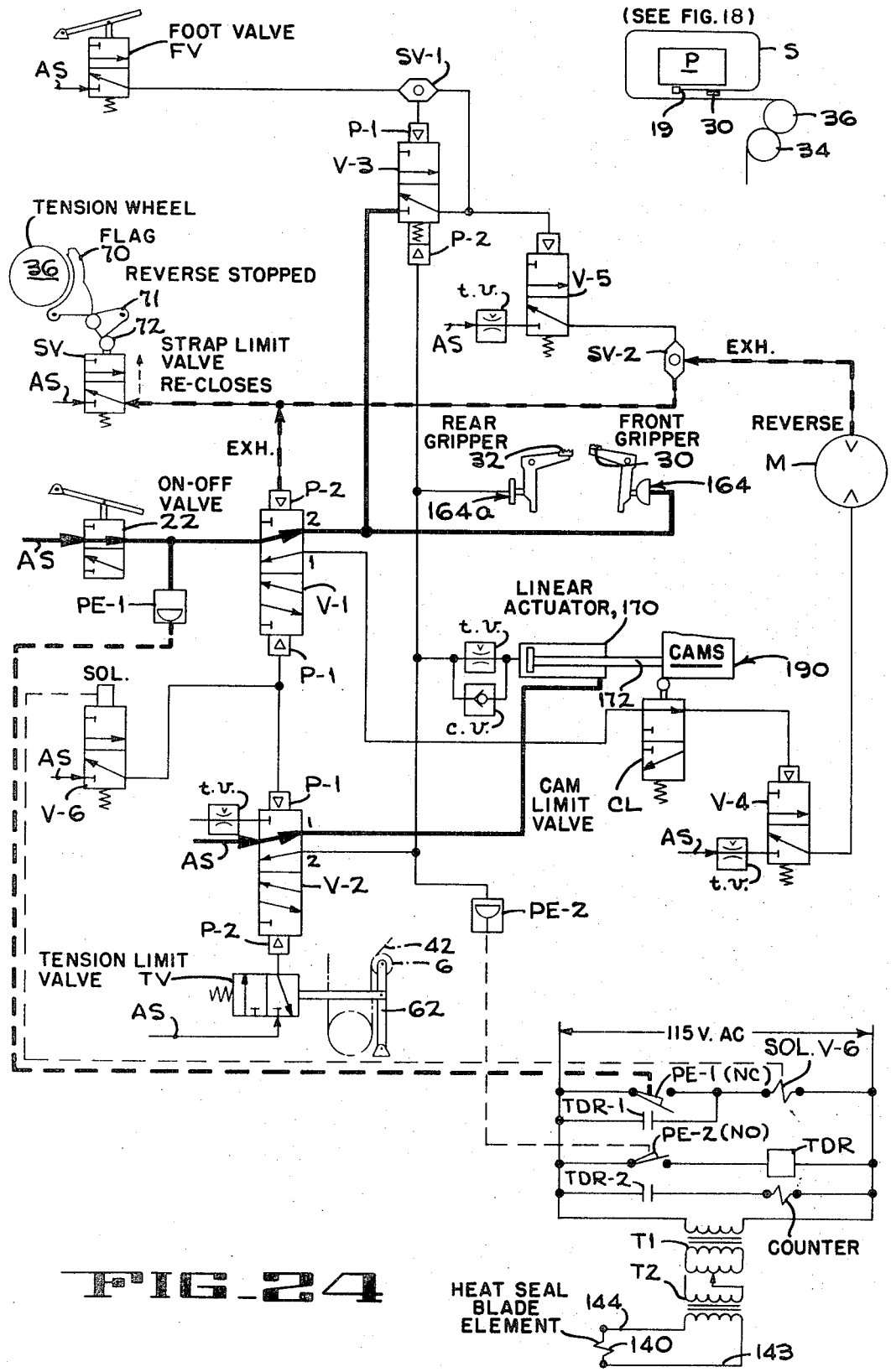

Referring to the control diagram of FIG. 24, closing of the strap limit valve SV exhausts air from the reverse or tension drive of the motor M and stops that motor so that the strap remains positioned about the drive wheel as shown in FIG. 18. The pilot P-2 of valve V-1 is also exhausted. Although reclosing of valve SV exhausts the pilot P-2 for valve V-1, this valve remains in its previous position, conducting air from its port 2 to the front gripper 30, as well as to the valve V-3, although the air is blocked at the latter valve. If not already present, a package P can be placed on the table of the machine ready for the strapping operation (FIG. 18).

Strap Tensioning

Figure 25:
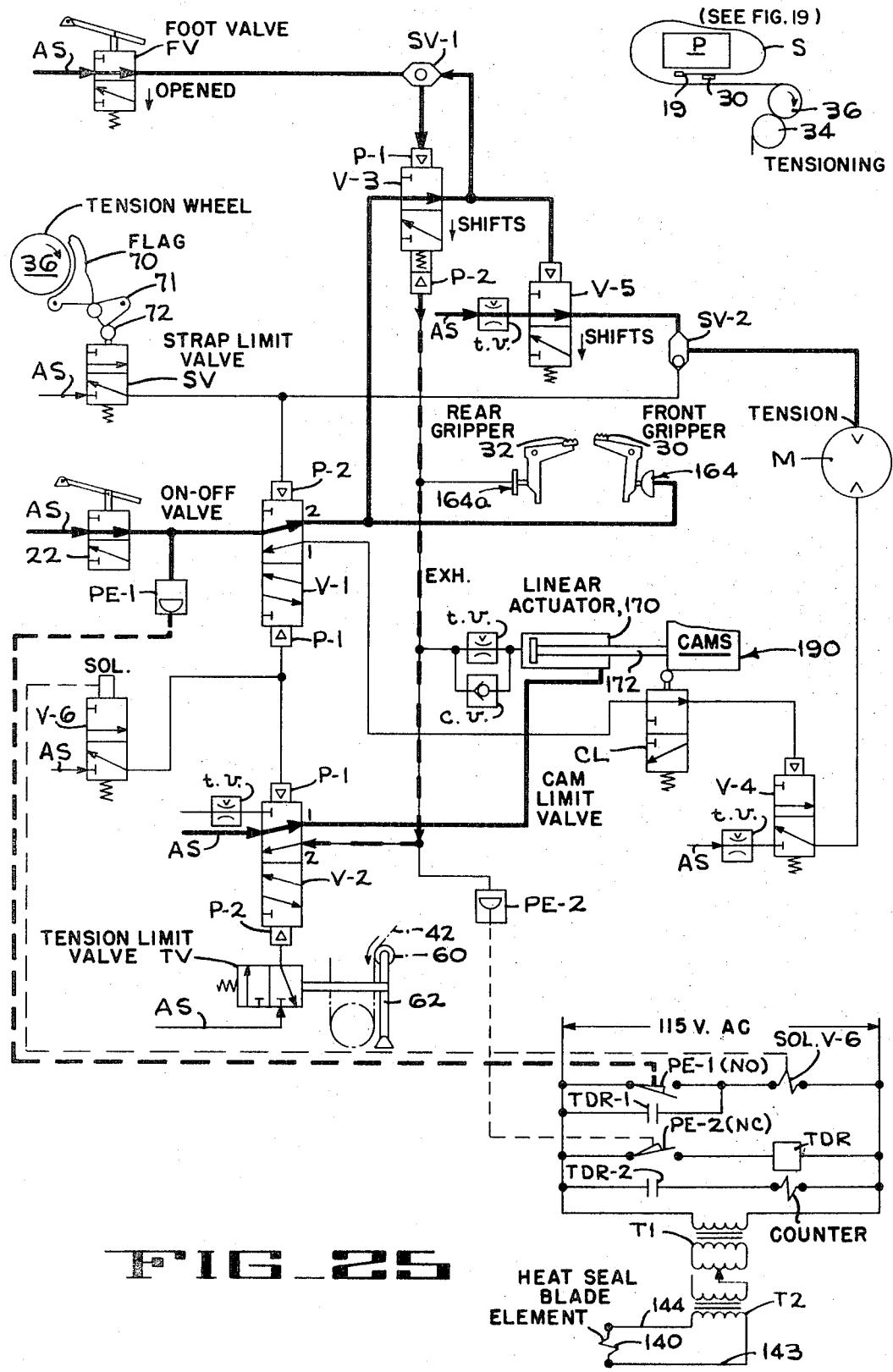

In order to tension the strap about the package P the foot valve FV is opened by the operator as indicated in the control diagram of FIG. 25. This admits air to the shuttle valve SV-1 and to the pilot P-1 of the valve V-3, shifting that valve. Its pilot P-2 is exhausted through port 2 of the valve V-2. It will be recalled that V-3 has previously received air from port 2 of the valve V-1, so that now this air is conducted to the pilot of the valve V-5 which shifts and admits air from the air supply AS through an adjustable throttle valve t.v. to the tension port of the feed wheel motor M. The tension speed is controlled by an adjustable needle in the valve t.v.

The tension wheel 36, as seen in FIG. 19, now rotates in the direction to pull the strap clear of the yoke and starts to tension it around the package P. The excess strap thus developed can be directed to an accummulator (not shown) beneath the machine. Air leaving the valve V-3 (FIG. 25) is also directed back to the shuttle valve SV-1 which in turn redirects it to the pilot P-1 of that valve, thereby rendering it unnecessary for the operator to hold the foot valve FV open once he has initiated the tensioning operation.

Tension Limit Valve Actuation

FIG. 20 shows the strap pulled tight around the package P by means of the chain drive 42 to the feed wheel 36. This removes the slack in the reach 42a of the drive chain 42 and hence swings the idler sprocket 60 to the right opening the tension limit valve TV because the tab 65 clears the operator for that valve.

Figure 26:
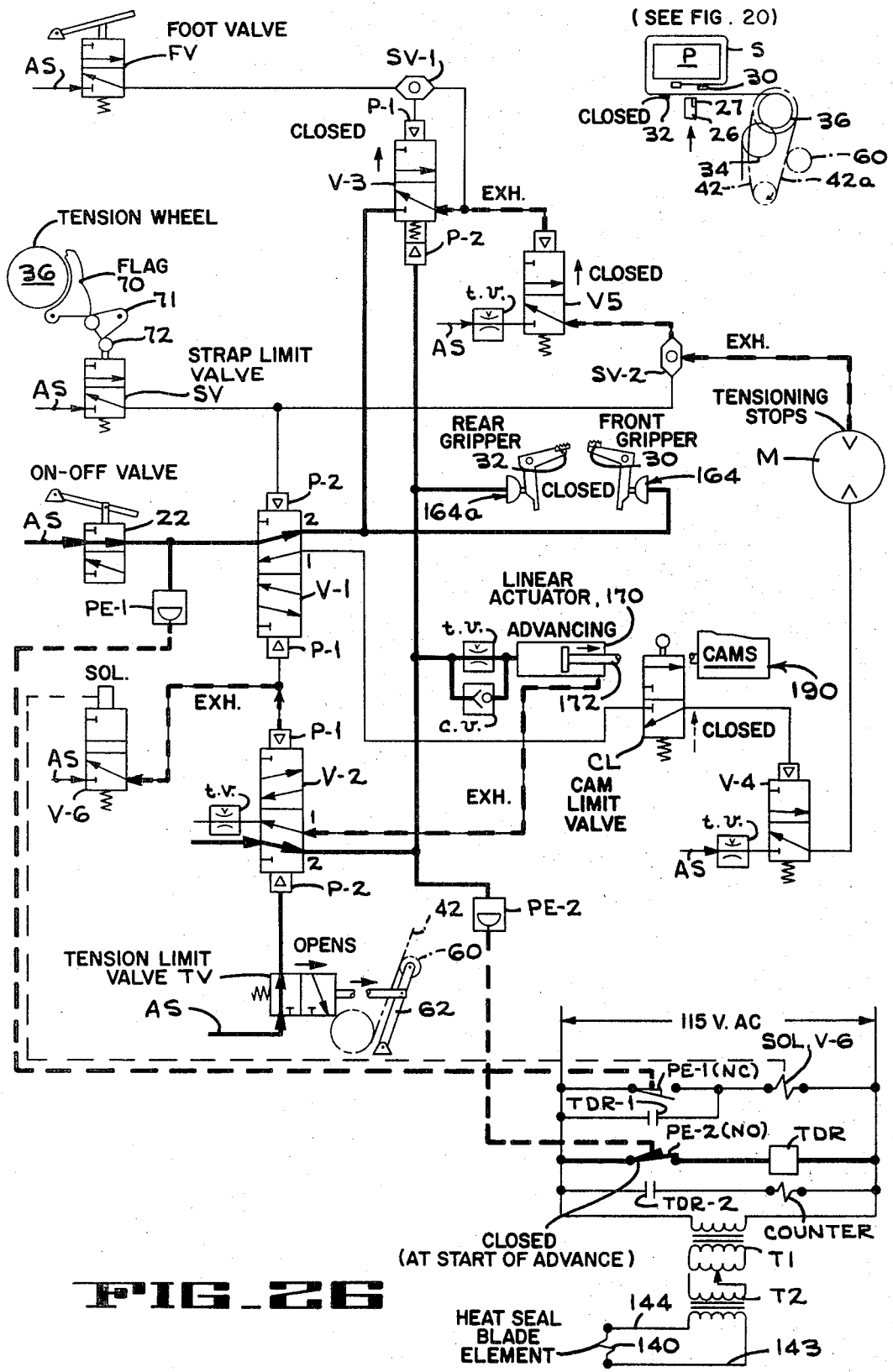

Referring to FIG. 26, the operator for the tension limit valve TV has been mechanically released and the valve is spring urged to its open position, thereby directing air to the pilot P-2 of the valve V-2. The pilot P1 of the valve V-2 is exhausted through the valve V-6. The port 1 of valve V-2 connects the rod end of the linear actuator cylinder 170 to exhaust. Output port 2 of the valve V-2 admits air through a check valve c.v. to the piston end of the linear actuator 170, thereby initiating its advance. The speed of the actuator advance is controlled by another throttle valve t.v. connected to the port 1 of the valve V-2.

In addition to the above, the output 2 of valve V-2 also admits air to the pilot P-2 of the valve V-3 closing that valve and connecting the pilot of the valve V-5 to its exhaust. This closes the valve V-5 (by its spring) and connects the tension port of motor M to exhaust through the shuttle valve SV-2 and the valve V-5, so that strap tensioning stops after the package has been tightly strapped.

In addition, output 2 of the valve V-2 also conducts air to the diaphragm actuator 164a for the rear gripper 32, and closes that gripper maintaining the strap tension about the package. Finally, pressure from output 2 of the valve V-2 is directed to the pressure switch PE-2 which closes the contacts PE-2 (NO) energizing the time delay relay TDR, thus initiating the time delay period as the relay starts to time out.

The remainder of the cycle is described in detail in the parent application and will only be mentioned briefly.

The platen cam 178 begins raising the platen 26. The blade arm follower roller 152 is controlled by the blade cam 180 so that the blade assembly 28 is fully advanced between the end and the bight of the strap S.

Advance of the linear actuator also pulled the cam block away from the cam limit valve CL, closing that valve (control diagram FIG. 26) but this has no effect on the control circuit because no air supply is directed to the valve CL through the valve V-1, as is also indicated in the control diagram of FIG. 26.

Further advance of the linear actuator 170 swings the bell crank 182 fully to the right and hence fully withdraws the tongue 24.

The platen cam 178, applies an intermediate degree of pressure to the bight of the strap, the blade element 140, the strap end portion and the anvil 18. Also, at this time, the platen knife 27 cuts the strap at the shear plate 126, and the strap portions at the joint are being heated by the element 140.

However, at about this time the heat seal blade 28 starts retracting, in response to action of the blade cam 180.

Linear Cam Extension

Up to this point, the linear actuator 170 has been fully retracted. As shown in the control circuit of FIG. 26, when the tension limit valve TV opens, air is directed from port 2 of the valve V-2 to the piston end of the linear actuator 170, through the check valve c.v. and the latter starts advancing. Strapping is also tightened around the package P, and (as a result of shifting valve V-2 by the tension limit valve TV) the rear gripper 32 is closed, maintaining the strap tight around the package. The anvil 18 and tongue 24 are still in their advanced positions and the blade 28 is still retracted at this time.

As described in detail in the parent application, initial advance of the linear actuator causes the tongue-anvil cam 176 to rotate the bell crank 182 to the right, bringing the arm 214 against the tongue operating finger 120 for retracting the tongue.

When the linear actuator 170 is fully advanced, the bell crank is recentered, thereby losing control of the operator 120 for the tongue 24. However, the tongue, although it is spring loaded to its return position, cannot return because it is brought against the platen 26 which is in its raised position.

The platen cam 178 applies a final squeeze to the pre-heated strap joint after withdrawal of the heating blade element 140 from between the strap parts.

Linear Cam Retraction

Referring back to FIG. 26 it will be recalled that when the strap is fully tightened around the package, the removal of slack in the chain 42 opened the tension limit valve TV, energized the pressure switch PE-2 (through valve V-2) which closed contacts PE-2 (NO) and energized the time delay relay TDR. This relay now starts timing out, and subsequently closes contacts TDR-1 and TDR-2.

Referring again to the control diagram of FIG. 26, before the linear actuator will have fully advanced, and before the relay TDR times out, the normally open contacts TDR-1 and TDR-2 remain open. These contacts are closed by timing out of TDR after full advance. Closing of contacts TDR-2 energizes a counter, the details of which are not significant to the present invention.

However, the closing of normally open contacts TDR-1 by the timer bypasses the switch PE-1 (NC) (which is held open because of pressure on the pressure switch PE-1) and energizes the solenoid for the valve V-6.

V-6 is now shifted against its spring and opens, admitting air to the pilot operators P1 for both valves V-1 and V-2 shifting these valves. The pilots P2 for these valves are open to exhaust.

Output port 2 of the valve V-2 opens the piston end of the linear actuator 170 to exhaust through a throttle valve t.v. and also exhausts the pressure switch PE-2, thereby opening the contacts PE-2 (NO), de-energizing the time delay relay TDR which has already timed out and hence has provided a predetermined cooling time of about 0.2 to 0.5 seconds for the sealed joint while the linear actuator was fully advanced and the grippers closed. The actual duration of the timer period includes time for the advance stroke of the linear actuator, and hence is about 0.6 to 0.9 seconds.

Output port 2 of the valve V-2 also exhausts the actuator 164a for the rear gripper 32 which opens. Output 2 of the valve V-1 opens the actuator diagram 164 for the front gripper to exhaust so that the front gripper 30 also opens. The pilot operator P2 for valve V-3 is also exhausted through port 2 of the valve V-2 as is the air supply to the valve V-3.

Output 1 of the valve V-2 now directs air to the rod end of the linear actuator 170, which starts retracting.

The output port 1 of the valve V-1 directs air to the cam limit valve CL, but since the linear actuator 170 is not fully retracted, the valve CL is closed.

When the timer TDR timed out the contacts TDR-1 were first closed and then reopened by exhausting the pressure switch PE-2, de-energizing the timer.

The opening of contacts TDR-1 by de-energization of the time delay relay TDR de-energizes the solenoid of valve V-6 and the spring closes this valve. (It will be noted that contacts PE-1 (NC) for the solenoid of valve V-6 are also open because the pressure switch PE-1 is pressurized from the on-off valve 22). Thus the valve V-6 now exhausts the pilots P-1 of valves V-1 and V-2, insuring that they remain in the condition to which they were shifted.

The output 1 of valve V-2 being directed to the rod end of the linear actuator 170 continues retracting the cylinder along with the linear cams and the exhaust from the piston end passes through the associated throttle valve t.v. at the piston end of the cylinder. The check valve c.v. for the piston end of the cylinder is closed, both grippers are released and retraction of the cylinder lowers the platen 26. The tongue-anvil cam 176 swings the bell crank 182 to the left and thus retracts the anvil. The blade assembly 28 is maintained in its retracted position by its cam follower roller 152. The strap joint is now sealed and cooled, ready for removal from the anvil 18.

While the linear actuator 170 is still retracting but is approaching its fully retracted position, the tongue-anvil cam 176 rocks the bell crank 182 to a position wherein the anvil 18 is fully retracted and retraction of the anvil 18 also retracts the tongue 24. The platen 26 is now fully lowered, with its follower roller 136 riding on the lowest portion of the platen cam 178. The blade cam 180 now holds the blade in its retracted position and the hold out 194 can be lowered (at the end of the retraction stroke) without losing control of the blade.

The joint in the strap has been completed and the package will probably be removed at this time.

When the linear actuator 170 is fully retracted the bell crank 182 is centered, the platen 26 is fully lowered and the blade 28 is fully retracted. However, when the bell crank 182 re-centered, it cleared the anvil operating finger 104 so that the anvil could spring back into position above the platen, thereby allowing the tongue 24 to also assume its inward or advanced position.

Referring back to the control diagram of FIG. 22 when the linear actuator is fully retracted, the cam block 190 opens the cam limit valve CL so that air from the outlet port 1 of the valve V-1 (which had been previously directed to the valve CL) is passed on to the pilot of the valve V-4, and the latter valve is now opened. Air from the supply AS now passes through the throttle valve t.v. for the valve V-4, through the valve itself, and on to the feed port of the motor M, thereby automatically initiating a re-feeding of the strap. The cycle previously described with regard to FIG. 22, et seq., continues.

A review of the circuit diagrams will show that if at any time during the cycle of the operation the on-off valve 22 is shifted to its off position, both grippers will open, the linear actuator will be fully retracted and the machine will be returned to the condition illustrated in the control diagram of FIG. 21. This condition facilitates clearing of the strap from the machine in the event of a malfunction.

The strap S is made of a strong, heat sealable thermoplastic material, such as polypropylene, polyester, nylon, etc.

Although the best mode contemplated for carrying out the present invention has been herein shown and described, it will be apparent that modification and variation may be made without departing from what is regarded to be the subject matter of the invention.

What I claim is:

1. Article strapping apparatus of the type wherein reversible, power driven strap transport wheel means includes a friction feed wheel that feeds the strap through an article receiving yoke and a friction tension wheel, means for gripping the free end of the strap, and the transport wheel means is reversed to cause the tension wheel to tension the strap; the improvement wherein said feed and tensioning friction wheels are of the same diameter and are geared solidly together, said wheels being covered with a rubber-like material for peripherally gripping the strap between them, and means for guiding the strap so that the strap enters at the feed wheel and wraps around it at least 90° whereupon the strap passes through the nip of the wheels, wraps around the tensioning wheel at least 180° and continues on to the yoke.

* * * * *